US012106720B2

(12) United States Patent
Lee et al.

(10) Patent No.: US 12,106,720 B2
(45) Date of Patent: Oct. 1, 2024

(54) DISPLAY DEVICE AND METHOD OF OPERATING THE DISPLAY DEVICE

(71) Applicant: SAMSUNG DISPLAY CO., LTD., Gyeonggi-do (KR)

(72) Inventors: Hyojin Lee, Gyeonggi-do (KR); Woomi Bae, Daegu (KR); Hui Nam, Gyeonggi-do (KR); Jinyoung Roh, Gyeonggi-do (KR); Sehyuk Park, Gyeonggi-do (KR); Jaekeun Lim, Gyeonggi-do (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/863,519

(22) Filed: Jul. 13, 2022

(65) Prior Publication Data

US 2023/0065185 A1 Mar. 2, 2023

(30) Foreign Application Priority Data

Sep. 2, 2021 (KR) ........................ 10-2021-0116888

(51) Int. Cl.
*G09G 3/3266* (2016.01)

(52) U.S. Cl.
CPC ..................... *G09G 3/3266* (2013.01); *G09G 2320/0247* (2013.01); *G09G 2320/0271* (2013.01); *G09G 2360/14* (2013.01)

(58) Field of Classification Search
CPC ......... G09G 3/3266; G09G 2320/0247; G09G 2320/0271
See application file for complete search history.

(56) References Cited

U.S. PATENT DOCUMENTS

| | | | | |
|---|---|---|---|---|
| 7,932,884 | B2 | 4/2011 | Song et al. | |
| 11,244,629 | B2 | 2/2022 | Cho et al. | |
| 2016/0196802 | A1 | 7/2016 | Nho et al. | |
| 2017/0018234 | A1* | 1/2017 | Na | G09G 3/3406 |
| 2020/0202766 | A1* | 6/2020 | Lee | G09G 1/167 |
| 2022/0270552 | A1 | 8/2022 | Roh et al. | |
| 2022/0343855 | A1* | 10/2022 | Shang | G09G 3/20 |

FOREIGN PATENT DOCUMENTS

| | | | |
|---|---|---|---|
| KR | 1020080093758 | A | 10/2008 |
| KR | 20180036892 | A | 4/2018 |
| KR | 10195493 | B1 | 3/2019 |
| KR | 1020190076177 | A | 7/2019 |
| KR | 1020200040344 | A | 4/2020 |
| KR | 1020210043773 | A | 4/2021 |

* cited by examiner

*Primary Examiner* — Dennis P Joseph
(74) *Attorney, Agent, or Firm* — CANTOR COLBURN LLP

(57) ABSTRACT

A display device includes a display panel including a plurality of pixel rows, and a panel driver which drives the display panel. The panel driver determines whether input image data represents a still image. When the input image data represents the still image, the panel driver determines a flicker value of the still image, applies a compensation value corresponding to a carry shift interval to the flicker value, determines a driving frequency for the display panel based on the flicker value to which the compensation value is applied, and performs an alternate driving operation for the display panel at the driving frequency.

20 Claims, 18 Drawing Sheets

NORMAL DRIVING
(60Hz)

NORMAL DRIVING
(30Hz)

ALTERNATE DRIVING
(30Hz)

NORMAL DRIVING
(60Hz)

FIG. 8

| GRAY LEVEL | FLICKER VALUE | FREQUENCY(Hz) |
|---|---|---|
| ... | ... | ... |
| L1~L2 | FV1 | DF1 |
| ... | ... | ... |
| L3~L4 | FV2 | DF2 |
| ... | ... | ... |

DISPLAY DEVICE AND METHOD OF OPERATING THE DISPLAY DEVICE

This application claims priority to Korean Patent Application No. 10-2021-0116888, filed on Sep. 2, 2021, and all the benefits accruing therefrom under 35 U.S.C. § 119, the content of which in its entirety is herein incorporated by reference.

BACKGROUND

1. Field

Embodiments of the invention relate to a display device, and more particularly to a display device performing an alternate driving operation, and a method of operating the display device.

2. Description of the Related Art

Reduction of power consumption may be desirable in a display device employed in a portable device, such as a smartphone, a tablet computer, etc., for example, in order to extend battery life. In order to reduce the power consumption of the display device, a low frequency driving technique which drives or refreshes a display panel at a frequency lower than a normal driving frequency by analyzing image data is being developed.

SUMMARY

In a case where a display device includes a pixel having a great leakage current, for example, a pixel including low-temperature polycrystalline silicon ("LTPS") p-type metal-oxide-semiconductor ("PMOS") transistors, a luminance of a display panel driven at a normal driving frequency and a luminance of the display panel driven at a low frequency lower than the normal driving frequency may be different from each other, and a flicker may occur when a driving frequency of the display panel is changed between the normal driving frequency and the low frequency.

Embodiments provide a display device capable of performing an alternate driving operation without a flicker.

Embodiments provide a method of operating a display device capable of performing an alternate driving operation without a flicker.

In an embodiment of the invention, there is provided a display device including a display panel including a plurality of pixel rows, and a panel driver which drives the display panel. The panel driver determines whether input image data represents a still image. When the input image data represents the still image, the panel driver determines a flicker value of the still image, applies a compensation value corresponding to a carry shift interval to the flicker value, determines a driving frequency for the display panel based on the flicker value to which the compensation value is applied, and performs an alternate driving operation for the display panel at the driving frequency.

In an embodiment, to perform the alternate driving operation, the panel driver may divide a frame period into N periods, may divide the plurality of pixel rows into N pixel row groups each including the pixel rows having an interval of N pixel rows, and may sequentially drive the pixel rows included in a corresponding one of the N pixel row groups in each of the N periods, where N is an integer greater than 1.

In an embodiment, the panel driver may include a still image detector which determines whether the input image data represents the still image, and a driving frequency decider which determines the driving frequency for the display panel as a normal driving frequency when the input image data does not represent the still image, and determines the driving frequency for the display panel as a low frequency lower than the normal driving frequency based on the flicker value to which the compensation value is applied when the input image data represents the still image.

In an embodiment, the panel driver may perform a normal driving operation for the display panel at the normal driving frequency when the input image data does not represent the still image, and may perform the alternate driving operation for the display panel at the low frequency when the input image data represents the still image.

In an embodiment, the still image detector may determine whether the input image data represents the still image by comparing the input image data in a previous frame period and the input image data in a current frame period.

In an embodiment, the driving frequency decider may include a flicker lookup table ("LUT") which stores a plurality of flicker values respectively corresponding to a plurality of gray levels, an image analyzing block which determines a representative gray level of the input image data representing the still image, and determines the flicker value of the still image corresponding to the representative gray level by the flicker LUT, and a carry compensation block which stores the compensation value corresponding to the carry shift interval, applies the compensation value corresponding to the carry shift interval to the flicker value, and determines the driving frequency for the display panel based on the flicker value to which the compensation value is applied.

In an embodiment, the representative gray level of the input image data may be an average value, a maximum value or a minimum value of gray levels represented by a plurality of pixel data included in the input image data.

In an embodiment, the carry compensation block may calculate the flicker value to which the compensation value is applied by multiplying the flicker value by the compensation value.

In an embodiment, the driving frequency decider may include a flicker LUT which stores a plurality of flicker values respectively corresponding to a plurality of gray levels, an image analyzing block which determines a representative gray level of the input image data representing the still image, and determines the flicker value of the still image corresponding to the representative gray level by the flicker LUT, a carry compensation value table which stores a plurality of compensation values respectively corresponding to a plurality of carry shift intervals, and a carry compensation block which reads the compensation value corresponding to the carry shift interval of the alternate driving operation from the carry compensation value table, applies the compensation value corresponding to the carry shift interval to the flicker value, and determines the driving frequency for the display panel based on the flicker value to which the compensation value is applied.

In an embodiment, the panel driver may include a controller which determines the carry shift interval based on an original driving frequency before compensation corresponding to the flicker value of the still image, and generates a carry control signal corresponding to the carry shift interval, and a scan driver including a plurality of stages respectively providing scan signals to the plurality of pixel rows, the scan driver which shifts a carry signal at the carry shift interval in the plurality of stages in response to the carry control signal.

In an embodiment, the controller may determine the carry shift interval by dividing a normal driving frequency by the original driving frequency before compensation.

In an embodiment, the carry control signal may include a first carry control signal corresponding to the carry shift interval having a value of 1, a second carry control signal corresponding to the carry shift interval having a value of 2, a third carry control signal corresponding to the carry shift interval having a value of 3, and a fourth carry control signal corresponding to the carry shift interval having a value of 4. The scan driver may further include a plurality of first switches which sequentially connect the plurality of stages in response to the first carry control signal, a plurality of second switches which connect the plurality of stages at an interval of two stages in response to the second carry control signal, a plurality of third switches which connect the plurality of stages at an interval of three stages in response to the third carry control signal, and a plurality of fourth switches which connect the plurality of stages at an interval of four stages in response to the fourth carry control signal.

In an embodiment of the invention, there is provided a display device including a display panel including a plurality of pixel rows, and a panel driver which drives the display panel and includes a plurality of flicker LUTs respectively corresponding to a plurality of carry shift intervals. The panel driver determines whether input image data represents a still image. When the input image data represents the still image, the panel driver selects a flicker LUT corresponding to a current carry shift interval from among the plurality of flicker LUTs, determines a flicker value of the still image by the selected flicker LUT, determines a driving frequency for the display panel based on the flicker value, and performs an alternate driving operation for the display panel at the driving frequency.

In an embodiment, each of the plurality of flicker LUTs may store a plurality of flicker values respectively corresponding to a plurality of gray levels with respect to a corresponding one of the plurality of carry shift intervals.

In an embodiment, the panel driver may further include a still image detector which determines whether the input image data represents the still image, and a driving frequency decider which determines the driving frequency for the display panel as a normal driving frequency when the input image data does not represent the still image. When the input image data represents the still image, the driving frequency decider may determine a representative gray level of the input image data representing the still image, may select the flicker LUT corresponding to the current carry shift interval from among the plurality of flicker LUTs, may determine the flicker value of the still image corresponding to the representative gray level by the selected flicker LUT, and may determine the driving frequency for the display panel based on the flicker value.

In an embodiment of the invention, there is provided a method of operating a display device. In the method, whether input image data represents a still image is determined, a flicker value of the still image is determined when the input image data represents the still image, a compensation value corresponding to a carry shift interval is applied to the flicker value, a driving frequency for a display panel is determined based on the flicker value to which the compensation value is applied, and an alternate driving operation for the display panel is performed at the driving frequency.

In an embodiment, to perform the alternate driving operation, a frame period may be divided into N periods, a plurality of pixel rows of the display panel may be divided into N pixel row groups each including the pixel rows having an interval of N pixel rows, and the pixel rows included in a corresponding one of the N pixel row groups may be sequentially driven in each of the N periods, where N is an integer greater than 1.

In an embodiment, to determine whether the input image data represents the still image, the input image data in a previous frame period and the input image data in a current frame period may be compared, it may be determined that the input image data does not represent the still image when the input image data in the previous frame period and the input image data in the current frame period are different from each other, and it may be determined that the input image data represents the still image when the input image data in the previous frame period and the input image data in the current frame period are substantially the same as each other.

In an embodiment, to determine the flicker value of the still image, a representative gray level of the input image data representing the still image may be determined, and the flicker value of the still image corresponding to the representative gray level may be determined by a flicker LUT that stores a plurality of flicker values respectively corresponding to a plurality of gray levels.

In an embodiment, to apply the compensation value to the flicker value, the flicker value to which the compensation value is applied may be calculated by multiplying the flicker value by the compensation value.

As described above, in embodiments of a display device and a method of operating the display device, in a case where input image data represents a still image, a flicker value of the still image may be determined, a compensation value corresponding to a carry shift interval of an alternate driving operation may be applied to the flicker value, a driving frequency for a display panel may be determined based on the flicker value to which the compensation value is applied, and the alternate driving operation for the display panel may be performed at the driving frequency. Accordingly, since compensation is performed corresponding to the carry shift interval of the alternate driving operation, a luminance difference between a normal driving operation and the alternate driving operation may be decreased, and a flicker may be prevented.

Further, in embodiments of a display device and a method of operating the display device, in a case where input image data represents a still image, a driving frequency for a display panel may be determined by a plurality of flicker LUTs respectively corresponding to a plurality of carry shift intervals, and an alternate driving operation for the display panel may be performed at the driving frequency. Accordingly, since a flicker LUT corresponding to a current carry shift interval of the alternate driving operation is used, a luminance difference between a normal driving operation and the alternate driving operation may be decreased, and a flicker may be prevented.

BRIEF DESCRIPTION OF THE DRAWINGS

Illustrative, non-limiting embodiments will be more clearly understood from the following detailed description in conjunction with the accompanying drawings.

FIG. 8 is a diagram illustrating an embodiment of a flicker lookup table ("LUT") illustrated in FIG. 7.

DETAILED DESCRIPTION

Figure 1:
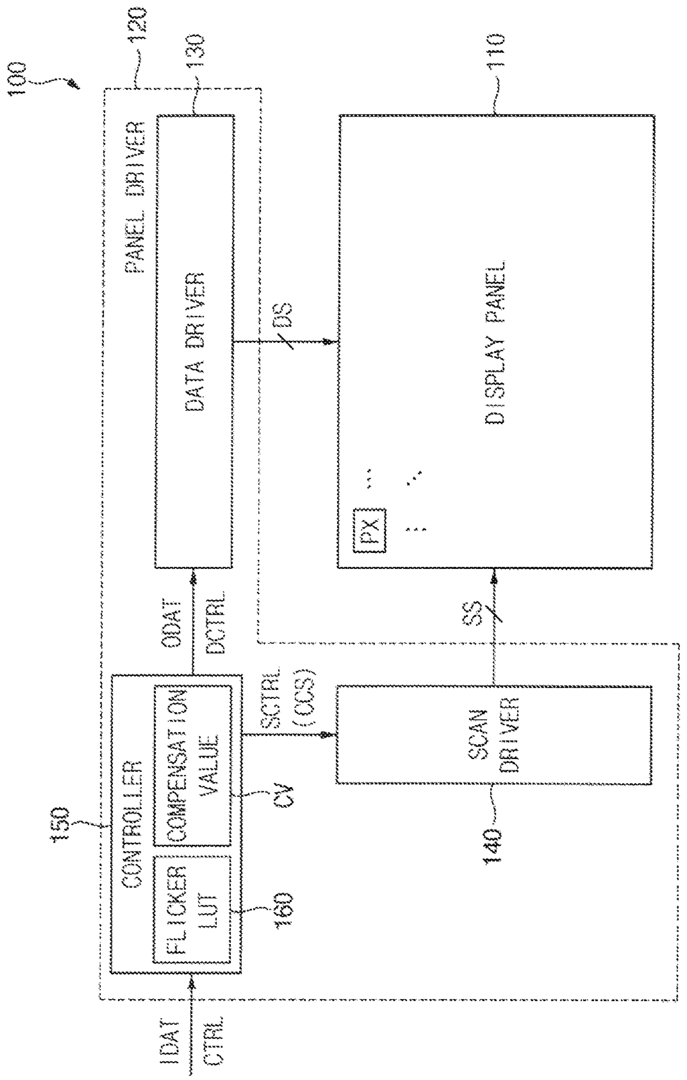
FIG. 1 is a block diagram illustrating an embodiment of a display device.

Hereinafter, embodiments of the invention will be explained in detail with reference to the accompanying drawings.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein. A term such as "block" may mean a hardware component such as a circuit, for example.

Figure 2:
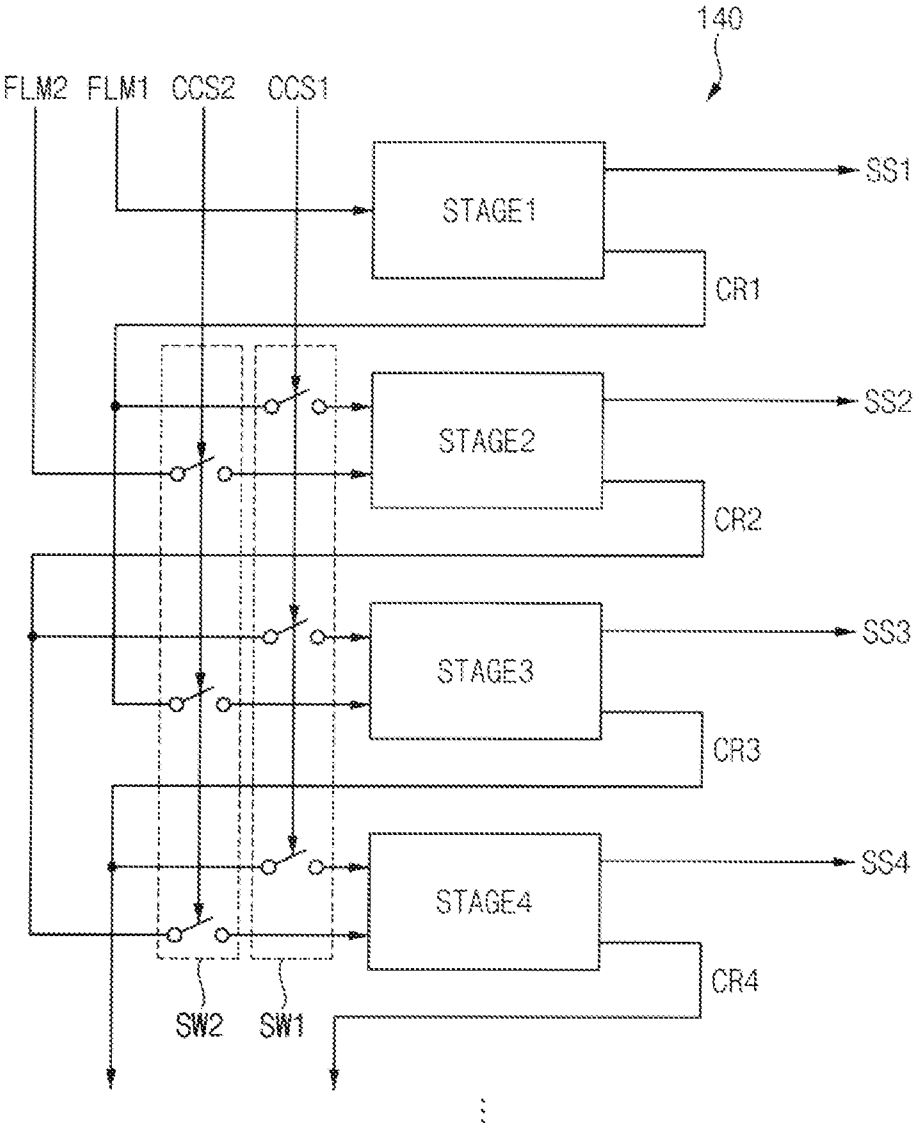
FIG. 2 is a block diagram illustrating an embodiment of a scan driver included in a display device.
Figure 3:
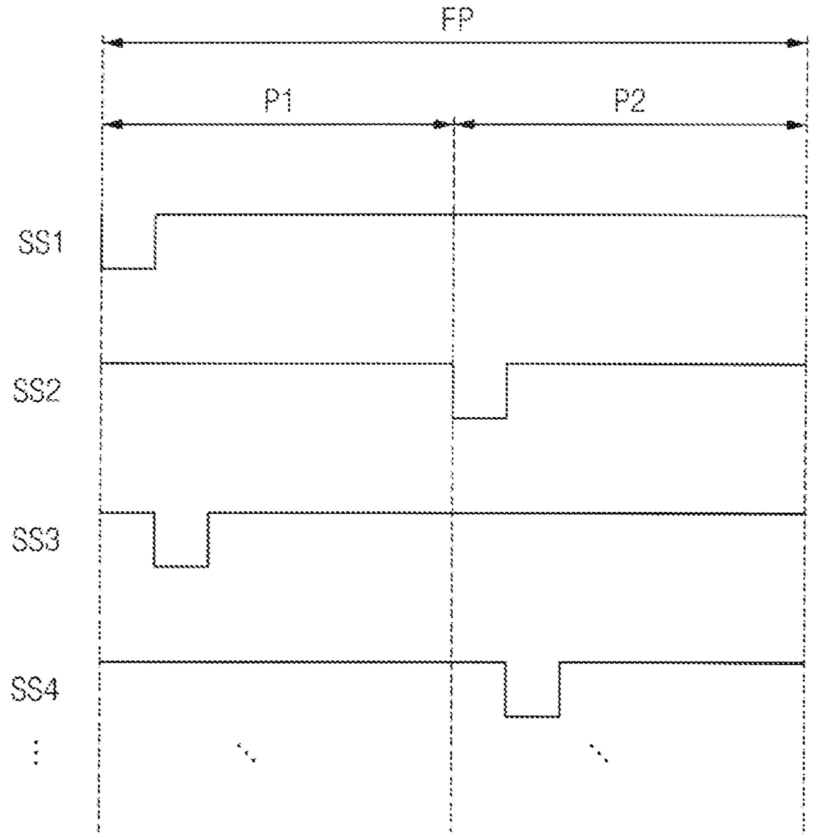
FIG. 3 is a timing diagram for describing an embodiment of an operation of a scan driver of FIG. 2.
Figure 4A:
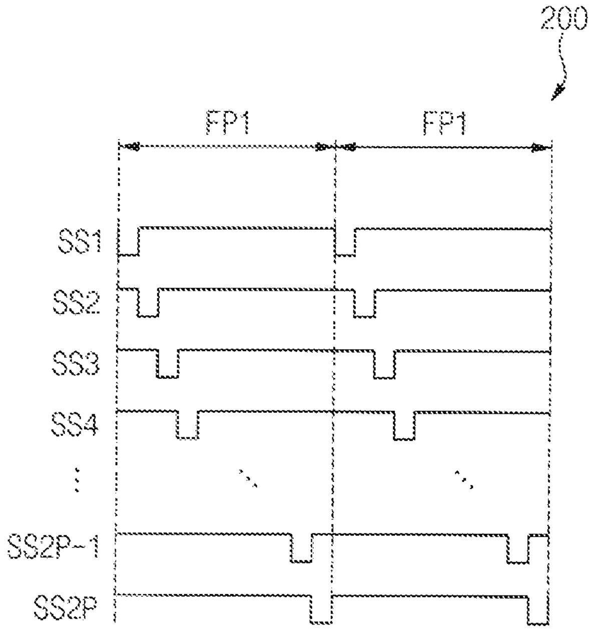
FIG. 4A is a diagram illustrating a comparative example of scan signals of a display device performing a normal driving operation at a normal driving frequency.
Figure 4B:
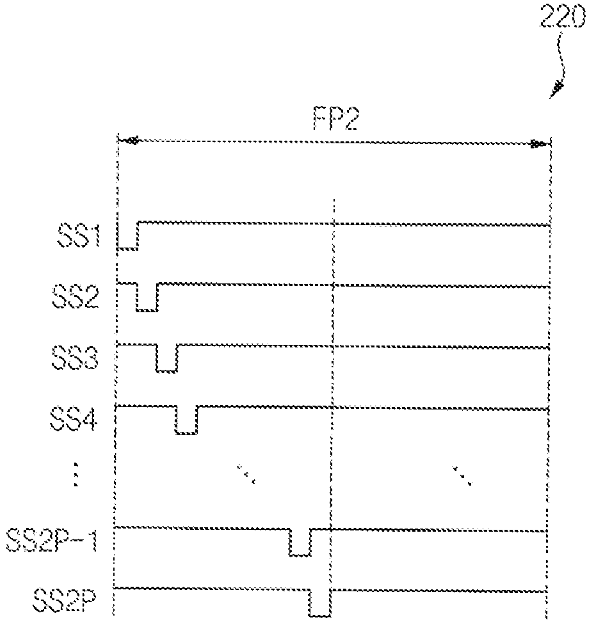
FIG. 4B is a diagram illustrating a comparative example of scan signals of a display device performing a normal driving operation at a low frequency.
Figure 4C:
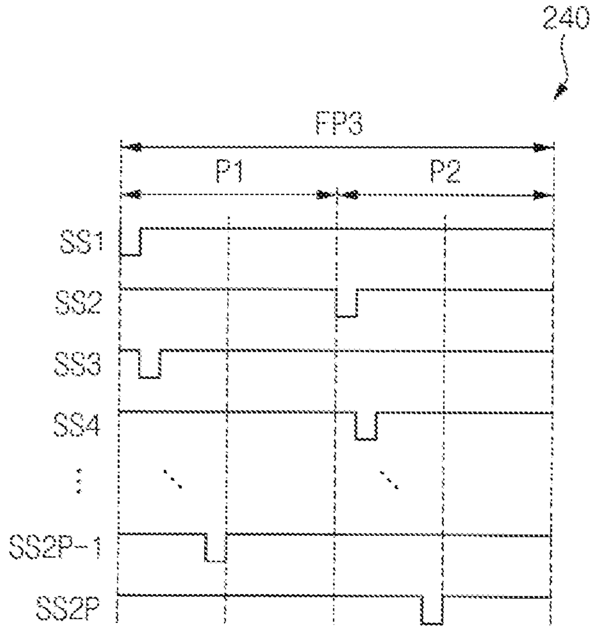
FIG. 4C is a diagram illustrating an embodiment of scan signals of a display device performing an alternate driving operation at a low frequency.
Figure 5A:
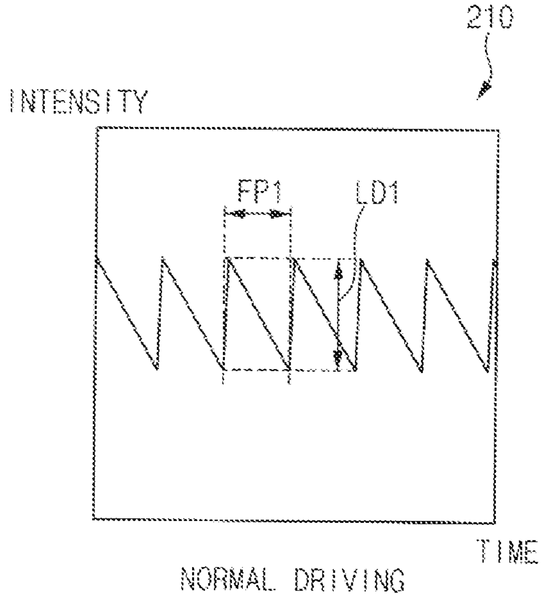
FIG. 5A is a diagram illustrating a comparative example of a light waveform of a display device performing a normal driving operation at a normal driving frequency.
Figure 5B:
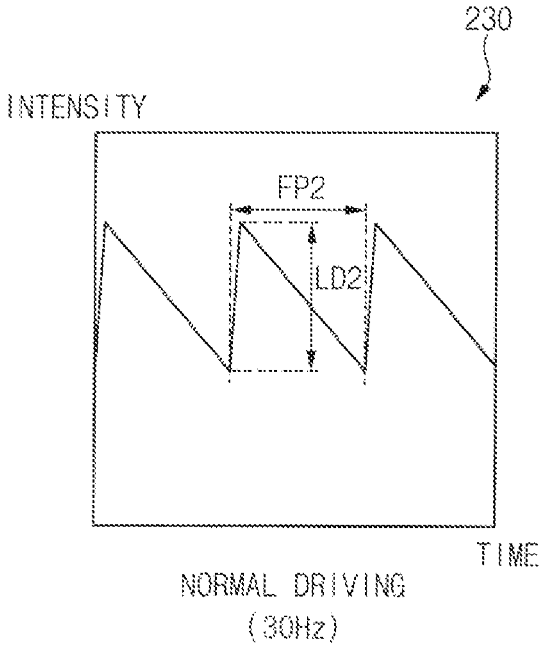
FIG. 5B is a diagram illustrating a comparative example of a light waveform of a display device performing a normal driving operation at a low frequency.
Figure 5C:
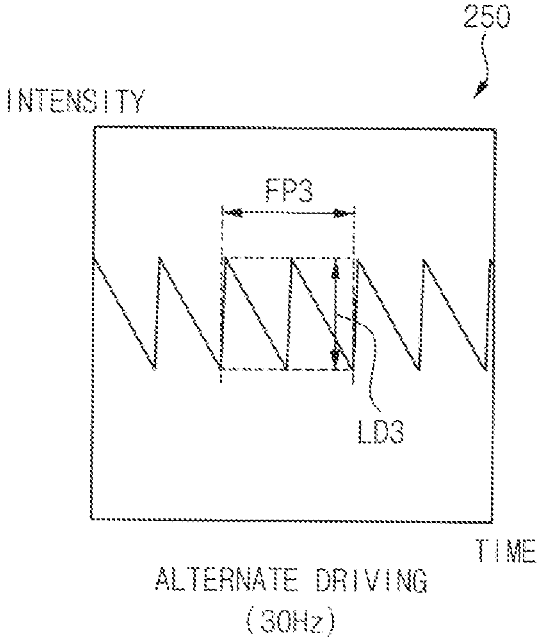
FIG. 5C is a diagram illustrating an embodiment of a light waveform of a display device performing an alternate driving operation at a low frequency.
Figure 6:
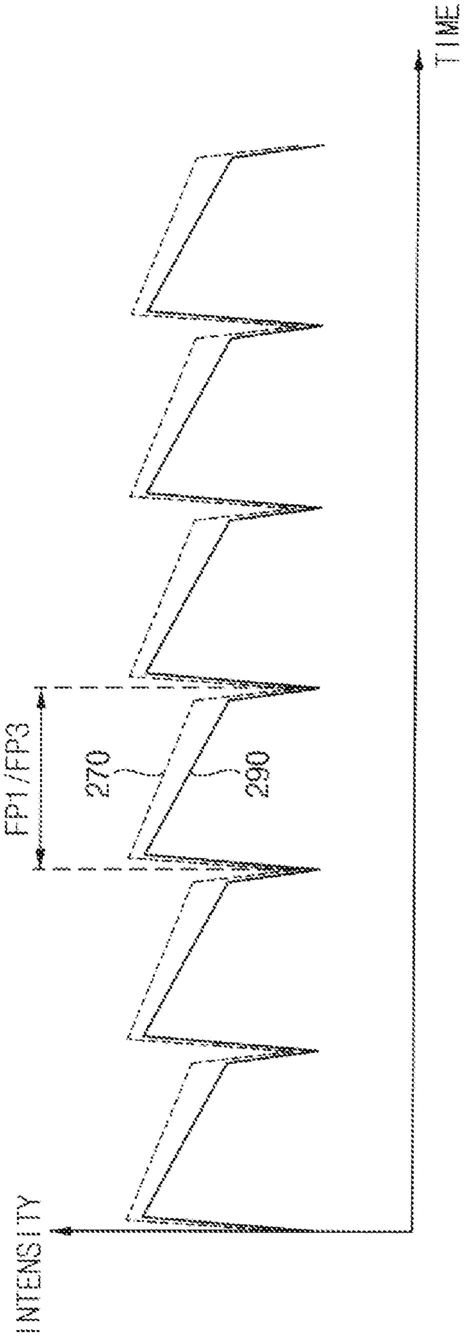
FIG. 6 is a diagram illustrating an embodiment where a light waveform of a display device performing a normal driving operation at a normal driving frequency and a light waveform of a display device performing an alternate driving operation at a low frequency are compared with each other.
Figure 7:
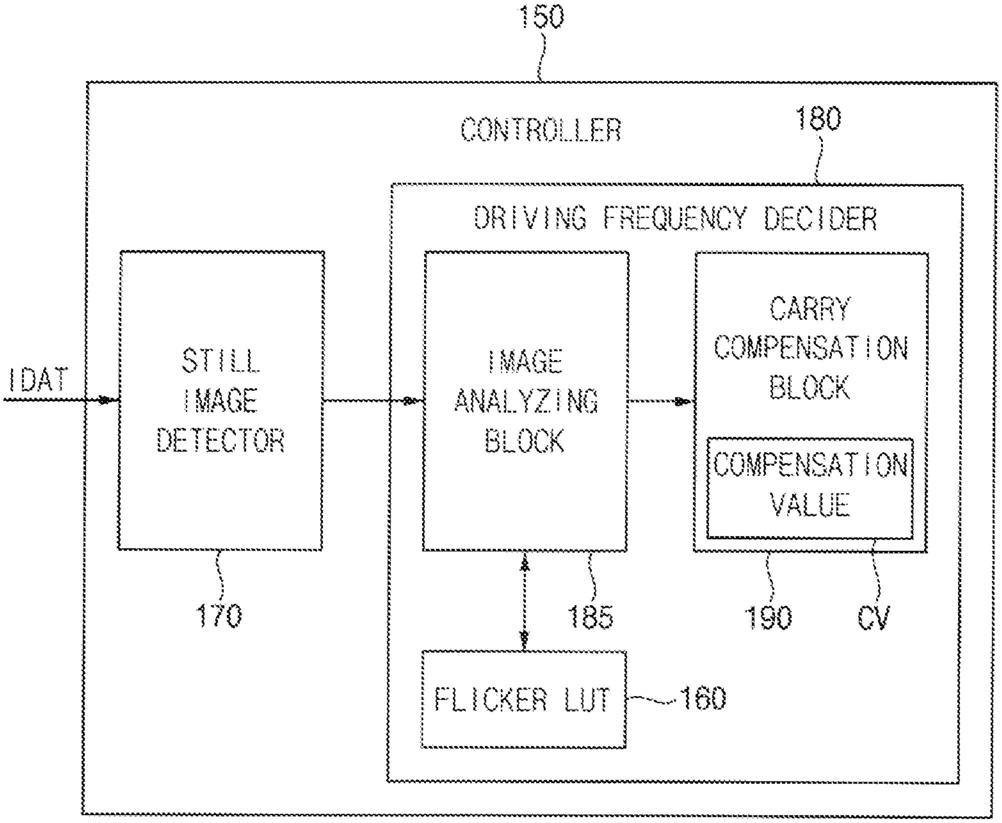
FIG. 7 is a block diagram illustrating an embodiment of a controller included in a display device.
Figure 9:
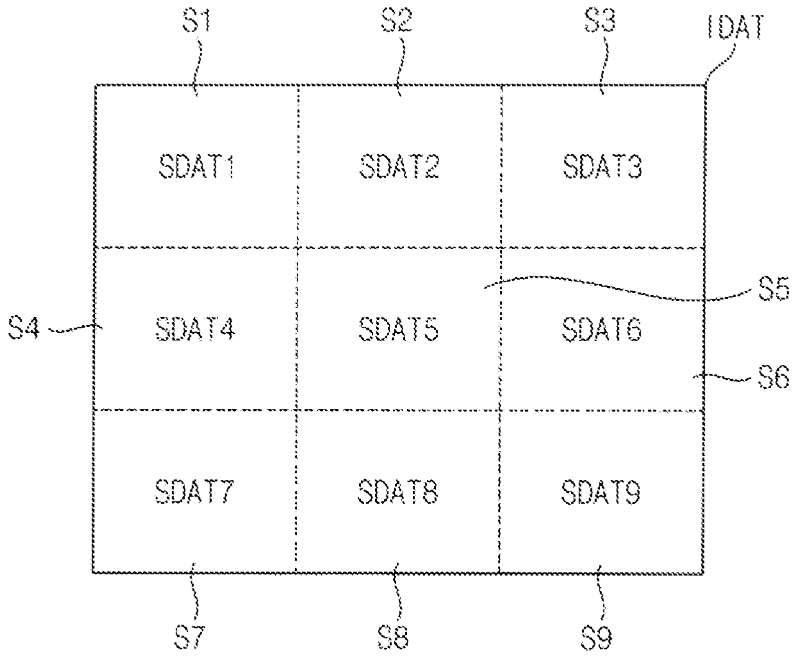
FIG. 9 is a diagram illustrating an embodiment where input image data is divided into a plurality of segment data for describing an operation of an image analyzing block illustrated in FIG. 7.
Figure 10:
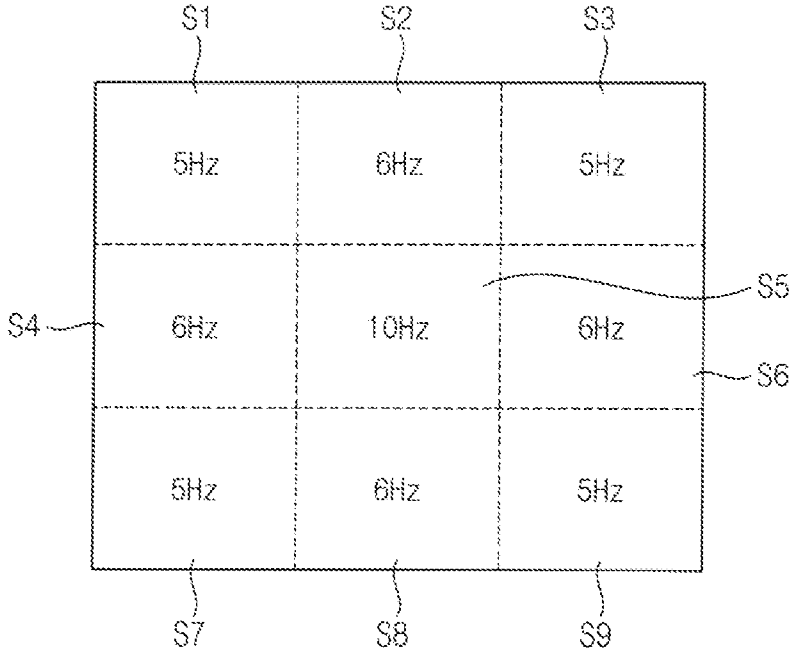
FIG. 10 is a diagram illustrating an embodiment where a driving frequency of a display panel is determined based on segment frequencies for describing an operation of an image analyzing block illustrated in FIG. 7.
Figure 11:
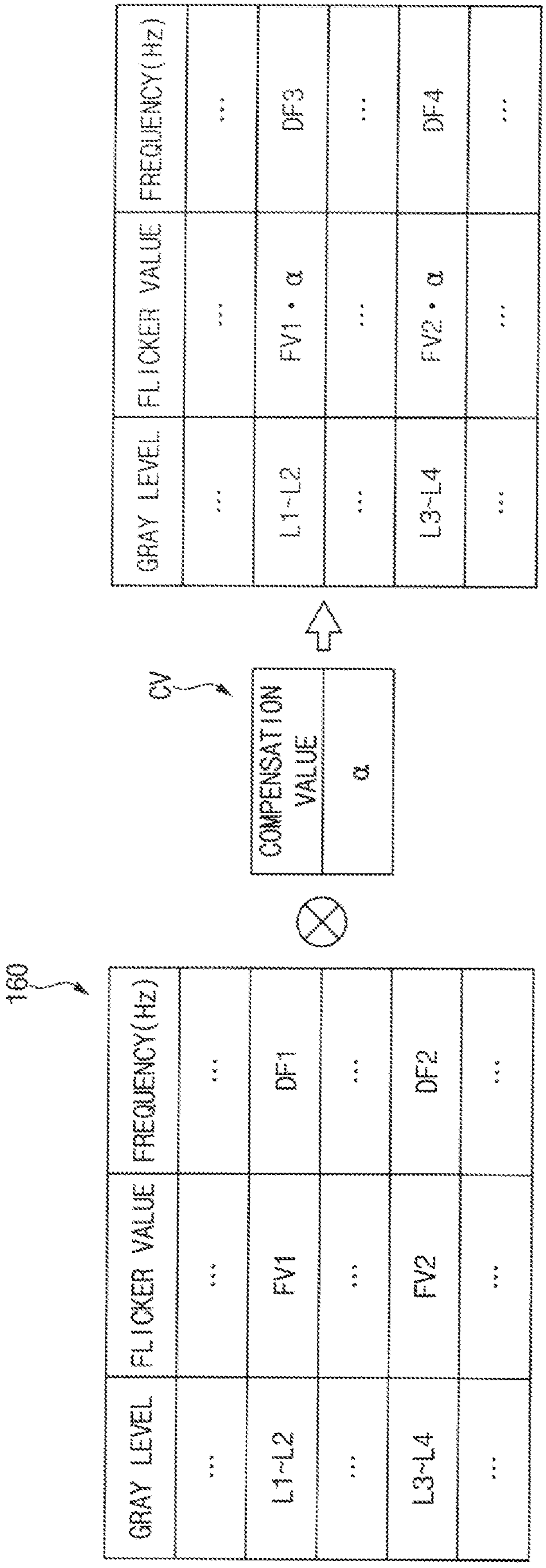
FIG. 11 is a diagram for describing an embodiment where a compensation value corresponding to a carry shift interval is applied to a flicker value of a flicker LUT in a display device.

FIG. 1 is a block diagram illustrating an embodiment of a display device, FIG. 2 is a block diagram illustrating an embodiment of a scan driver included in a display device, FIG. 3 is a timing diagram for describing an embodiment of an operation of a scan driver of FIG. 2, FIG. 4A is a diagram illustrating a comparative example of scan signals of a display device performing a normal driving operation at a normal driving frequency, FIG. 4B is a diagram illustrating a comparative example of scan signals of a display device performing a normal driving operation at a low frequency, and FIG. 4C is a diagram illustrating an embodiment of scan signals of a display device performing an alternate driving operation at a low frequency, FIG. 5A is a diagram illustrating a comparative example of a light waveform of a display device performing a normal driving operation at a normal driving frequency, FIG. 5B is a diagram illustrating a light waveform of a display device performing a normal driving operation at a low frequency, and FIG. 5C is a diagram illustrating an embodiment of a light waveform of a display device performing an alternate driving operation at a low frequency, FIG. 6 is a diagram illustrating an embodiment where a light waveform of a display device performing a normal driving operation at a normal driving frequency and a light waveform of a display device performing an alternate driving operation at a low frequency are compared with each other, FIG. 7 is a block diagram illustrating an embodiment of a controller included in a display device, FIG. 8 is a diagram illustrating an embodiment of a flicker lookup table ("LUT") illustrated in FIG. 7, FIG. 9 is a diagram illustrating an embodiment where input image data is divided into a plurality of segment data for describing an operation of an image analyzing block illustrated in FIG. 7, FIG. 10 is a diagram illustrating an embodiment where a driving frequency of a display panel is determined based on segment frequencies for describing an operation of an image analyzing block illustrated in FIG. 7, and FIG. 11 is a diagram for describing an embodiment where a compensation value corresponding to a carry shift interval is applied to a flicker value of a flicker LUT in a display device.

Referring to FIG. 1, an embodiment of a display device 100 may include a display panel 110 that includes a plurality of pixels PX, and a panel driver 120 that drives the display panel 110. In an embodiment, the panel driver 120 may include a data driver 130 that provides data signals DS to the plurality of pixels PX, a scan driver 140 that provides scan signals SS to the plurality of pixels PX, and a controller 150 that controls the data driver 130 and the scan driver 140.

The display panel 110 may include a plurality of data lines, a plurality of scan lines, and the plurality of pixels PX coupled to the plurality of data lines and the plurality of scan lines. In an embodiment, each pixel PX may include at least one capacitor, at least two transistors and an organic light-emitting diode ("OLED"), and the display panel 110 may be an OLED display panel. In an embodiment, the transistors of each pixel PX may be implemented with, but not limited to, low-temperature polycrystalline silicon ("LTPS") p-type metal-oxide-semiconductor ("PMOS") transistors, for example. In other embodiments, the transistors of each pixel PX may be implemented with n-type metal-oxide-semiconductor ("NMOS") transistors, or a combination of the PMOS transistors and the NMOS transistors. In other embodiments, the display panel 110 may be a light-emitting display panel where each pixel PX includes a light-emitting element other than the OLED, for example, a quantum dot ("QD") light-emitting element. In still other embodiments, the display panel 110 may be a liquid crystal display ("LCD") panel, or any other suitable display panels.

The data driver 130 may generate the data signals DS based on output image data ODAT and a data control signal DCTRL received from the controller 150, and may provide the data signals DS to the plurality of pixels PX through the plurality of data lines. In an embodiment, the data control signal DCTRL may include, but not limited to, an output data enable signal, a horizontal start signal and a load signal. In an embodiment, the data driver 130 and the controller 150 may be implemented with a single integrated circuit ("IC"), and the IC may be also referred to as a timing controller embedded data driver ("TED"). In other embodiments, the data driver 130 and the controller 150 may be implemented with separate ICs.

The scan driver 140 may generate the scan signals SS based on a scan control signal SCTRL received from the controller 150, and may provide the scan signals SS to the plurality of pixels PX through the plurality of scan lines. In an embodiment, the scan control signal SCTRL may include, but not limited to, a scan start signal and a scan clock signal. In an embodiment, the scan driver 140 may be integrated or formed in a peripheral portion of the display panel 110. In other embodiments, the scan driver 140 may be implemented with one or more ICs.

In an embodiment, the scan control signal SCTRL may further include a carry control signal CCS, and the scan driver 140 may control a carry shift interval (or a carry progress/propagation interval) in response to the carry control signal CCS. In an embodiment, as illustrated in FIG. 2, the carry control signal CCS may include a first carry control signal CCS1 corresponding to the carry shift interval having a value of 1, and a second carry control signal CCS2 corresponding to the carry shift interval having a value of 2, and the scan driver 140 may include a plurality of stages STAGE1, STAGE2, STAGE3, STAGE4, . . . etc., respectively providing the scan signals SS1, SS2, SS3, SS4, . . . etc., to a plurality of pixel rows of the display panel 110, a plurality of first switches SW1 sequentially connecting the plurality of stages STAGE1, STAGE2, STAGE3, STAGE4, . . . etc., in response to the first carry control signal CCS1, and a plurality of second switches SW2 connecting the plurality of stages STAGE1, STAGE2, STAGE3, STAGE4, . . . etc., at an interval of two stages in response to the second carry control signal CCS2, for example. That is, the plurality of second switches SW2 may connect odd-numbered stages STAGE1, STAGE3, . . . etc., to each other, and may connect even-numbered stages STAGE2, STAGE4, . . . etc., to each other.

In an embodiment, in a case where the scan driver 140 receives the first carry control signal CCS1, a first carry signal CR1 generated by a first stage STAGE1 based on a first scan start signal FLM1 may be shifted or transferred to a second stage STAGE2, a second carry signal CR2 generated by a second stage STAGE2 based on the first carry signal CR1 may be shifted or transferred to a third stage STAGE3, a third carry signal CR3 generated by a third stage STAGE3 based on the second carry signal CR2 may be shifted or transferred to a fourth stage STAGE4, and a fourth carry signal CR4 generated by a fourth stage STAGE4 based on the third carry signal CR3 may be shifted or transferred to a subsequent stage (e.g., a fifth stage), for example. That is, the scan driver 140 may shift or transfer the carry signal CR1 through CR4 at the carry shift interval of 1 in response to the first carry control signal CCS1, and the panel driver 120 may perform a normal driving operation that sequentially drives the plurality of pixel rows of the display panel 110 corresponding to the carry shift interval of 1.

In another embodiment, in a case where the scan driver 140 receives the second carry control signal CCS2, the first carry signal CR1 generated by the first stage STAGE1 based on the first scan start signal FLM1 may be shifted or transferred to the third stage STAGE3, and the third carry signal CR3 generated by the third stage STAGE3 based on the first carry signal CR1 may be shifted or transferred to a subsequent stage (e.g., the fifth stage). Further, the second carry signal CR2 generated by the second stage STAGE2 based on a second scan start signal FLM2 may be shifted or transferred to the fourth stage STAGE4, and the fourth carry signal CR4 generated by the fourth stage STAGE4 based on the second carry signal CR2 may be shifted or transferred to a subsequent stage (e.g., a sixth stage). That is, the scan driver 140 may shift or transfer the carry signal CR1 through CR4 at the carry shift interval of 2 in response to the second carry control signal CCS2, and the panel driver 120 may perform an alternate driving operation corresponding to the carry shift interval of 2.

The controller 150 (e.g., a timing controller ("TCON")) may receive input image data IDAT and a control signal CTRL from an external host processor (e.g., an application processor ("AP"), a graphics processing unit ("GPU") or a graphics card). In an embodiment, the input image data IDAT may be an RGB image data including red image data, green image data and blue image data. Further, in an embodiment, the control signal CTRL may include, but not limited to, a vertical synchronization signal, a horizontal synchronization signal, an input data enable signal, a master clock signal, etc. The controller 150 may generate the output image data ODAT, the data control signal DCTRL and the scan control signal SCTRL based on the input image data IDAT and the control signal CTRL. The controller 150 may control an operation of the data driver 130 by providing the output image data ODAT and the data control signal DCTRL to the data driver 130, and may control an operation of the scan driver 140 by providing the scan control signal SCTRL to the scan driver 140.

In an embodiment of the display device 100, the panel driver 120 may perform the normal driving operation for the display panel 110 at a normal driving frequency while the display panel 110 displays a moving image, and may perform the alternate driving operation (or an alternate scan driving ("ASD") operation) for the display panel 110 at a low frequency lower than the normal driving frequency while the display panel 110 displays a still image. Here, the normal driving operation may be an operation that sequentially drives the plurality of pixel rows of the display panel 110, and the alternate driving operation may be an operation that divides one frame period into respective periods, divides the plurality of pixel rows into pixel row groups each including the pixel rows having a predetermined interval and drives one corresponding pixel row group in each of the respective periods.

In an embodiment, to perform the normal driving operation, the controller 150 may provide the first carry control signal CCS1 as the carry control signal CCS to the scan driver 140, the scan driver 140 may shift or transfer the carry signal CR1 through CR4 at the carry shift interval of 1 in response to the first carry control signal CCS1, and the panel driver 120 may perform the normal driving operation corresponding to the carry shift interval of 1. In other embodiments, to perform the normal driving operation, the controller 150 may control the scan driver 140 to sequentially output the scan signals SS by the first and second scan start signals FLM1 and FLM2 and the scan clock signal.

In an embodiment, to perform the alternate driving operation, the panel driver 120 may divide a frame period into N periods, where N is an integer greater than 1. Further, the panel driver 120 may divide the plurality of pixel rows into N pixel row groups. Here, one pixel row may mean one row of the pixels PX connected to the same scan line, and each pixel row group may include the pixel rows having an interval of N pixel rows. Further, in each of the N periods, the panel driver 120 may sequentially drive the pixel rows included in a corresponding one of the N pixel row groups.

In an embodiment, in a case where N is two, the plurality of pixel rows of the display panel 110 may be divided into an odd-numbered pixel row group and an even-numbered pixel row group, for example. In response to the second carry control signal CCS2, the scan driver 140 may connect the odd-numbered stages STAGE1, STAGE3, . . . etc., for the odd-numbered pixel row group to each other, and may connect the even-numbered stages STAGE2, STAGE4, . . . etc., for the even-numbered pixel row group to each other. Thus, odd-numbered carry signals CR1, CR3, . . . etc., may be shifted or transferred within the odd-numbered stages STAGE1, STAGE3, . . . etc., and even-numbered carry signals CR2, CR4, . . . etc., may be shifted or transferred within the even-numbered stages STAGE2, STAGE4, . . . etc. In this case, since the carry signals CR1, CR2, CR3, CR4, . . . etc., of the scan driver 140 are shifted or transferred at an interval of two stages, the carry shift interval of this alternate driving operation may be two stages or 2. Here, the carry shift interval may be an interval between one stage (e.g., the first stage STAGE1) and the next stage (e.g., the third stage STAGE3) to which the carry signal (e.g., the first carry signal CR1) generated by the one stage is shifted or transferred.

The scan driver 140 illustrated in FIG. 2 may operate as illustrated in FIG. 3 in response to the second carry control signal CCS2. As illustrated in FIGS. 2 and 3, to perform the alternate driving operation at the carry shift interval corresponding to two stages, one frame period FP may be divided into a first period P1 and a second period P2, and the plurality of pixel rows of the display panel 110 may be divided into two pixel row groups each having an interval of two pixel rows, or the odd-numbered pixel row group and the even-numbered pixel row group. In the first period P1, the odd-numbered stages STAGE1, STAGE3, . . . etc., of the scan driver 140 may sequentially provide the scan signals SS1, SS3, . . . etc., to the odd-numbered pixel row group, and the pixel rows in the odd-numbered pixel row group may be sequentially driven. Thereafter, in the second period P2, the even-numbered stages STAGE2, STAGE4, . . . etc., of the scan driver 140 may sequentially provide the scan signals SS2, SS4, . . . etc., to the even-numbered pixel row group, and the pixel rows in the odd-numbered pixel row group may be sequentially driven. Although FIGS. 2 and 3 illustrate an example where the alternate driving operation is performed at the carry shift interval of 2, in other embodiments, the alternate driving operation may be performed at the carry shift interval of 3 or more. In an embodiment, in the display device 100 performing the alternate driving operation at the carry shift interval of 3, (3L−2)-th stages of the scan driver 140 may be connected to each other, (3L−1)-th stages of the scan driver 140 may be connected to each other, and (3L)-th stages of the scan driver 140 may be connected to each other, where L is an integer greater than 0, for example.

In a conventional display device, even when a display panel is driven at the low frequency lower than the normal driving frequency, the conventional display device may perform the normal driving operation for the display panel. FIG. 4A illustrates a comparative example of scan signals of the conventional display device or the display device 100 performing the normal driving operation at the normal driving frequency (e.g., about 60 hertz (Hz)), FIG. 4B illustrates a comparative example of scan signals of the conventional display device performing the normal driving operation at the low frequency (e.g., about 30 Hz), and FIG. 4C illustrates an embodiment of scan signals of the display device 100 performing the alternate driving operation at the low frequency (e.g., about 30 Hz), and FIG. 5A illustrates a comparative embodiment of a light waveform 210 of the conventional display device or the display device 100 performing the normal driving operation at the normal driving frequency, FIG. 5B illustrates a comparative example of a light waveform 230 of the conventional display device performing the normal driving operation at the low frequency, and FIG. 5C illustrates an embodiment of a light waveform 250 of the display device 100 performing the alternate driving operation at the low frequency.

In a case where the normal driving operation is performed at the normal driving frequency of about 60 Hz, as illustrated in a first timing diagram 200 of FIG. 4A, in each frame period FP1, the conventional display device or an embodiments of the display device 100 may sequentially generate the scan signals SS1, SS2, SS3, SS4, . . . , SS2P-1 and SS2P and may sequentially drive the plurality of pixel rows, for example. In a case where the conventional display device performs the normal driving operation at the low frequency of about 30 Hz, a frame period FP2 corresponding to the low frequency of about 30 Hz may be a double of the frame period FP1 corresponding to the normal driving frequency of about 60 Hz. In this case, as illustrated in a second timing diagram 220 of FIG. 4B, in a first half of the frame period FP2, the conventional display device may sequentially generate the scan signals SS1, SS2, SS3, SS4, . . . , SS2P-1 and SS2P and may sequentially drive the plurality of pixel rows. In this case, as illustrated in FIGS. 5A and 5B, a luminance difference LD2 between a maximum luminance and a minimum luminance within one frame period FP2 in the conventional display device performing the normal driving operation at the low frequency of about 30 Hz may be greater than a luminance difference LD1 within one frame period FP1 in the conventional display device performing the normal driving operation at the normal driving frequency of about 60 Hz. Thus, a flicker may occur in the conventional display device performing the normal driving operation at the low frequency of about 30 Hz.

However, when the display device 100 in embodiments drives the display panel 110 at the low frequency of about 30 Hz, the display device 100 may perform the alternate driving operation for the display panel 110 at the low frequency of about 30 Hz. A frame period FP3 corresponding to the low frequency of about 30 Hz may be a double of the frame period FP1 corresponding to the normal driving frequency of about 60 Hz, and the frame period FP3 may be divided into the first period P1 and the second period P2. As illustrated in a third timing diagram 240 of FIG. 4C, in a first half of the first period P1, the display device 100 may sequentially generate the scan signals SS1, SS3, . . . , SS2P-1 for the odd-numbered pixel row group, and may sequentially drive the pixel rows in the odd-numbered pixel row group. Further, in a first half of the second period P2, the display device 100 may sequentially generate the scan signals SS2, SS4, . . . , SS2P for the even-numbered pixel row group, and may sequentially drive the pixel rows in the even-numbered pixel row group. In this case, as illustrated in FIG. 5C, a luminance difference LD3 between within one frame period FP3 in the display device 100 performing the alternate driving operation at the low frequency of about 30 Hz may be similar to a luminance difference LD1 within one frame period FP1 in the display device 100 performing the normal driving operation at the normal driving frequency of about 60 Hz. Tus, in the display device 100 performing the alternate driving operation, even when the display panel 110 is driven at the low frequency lower than the normal driving frequency, the flicker may be prevented.

However, a luminance of the display device 100 performing the alternate driving operation at the low frequency may not be the same as a luminance of the display device 100 performing the normal driving operation at the normal driving frequency. In an embodiment, as illustrated in the first and third timing diagrams 200 and 240, during the same time length, the number of the pixel rows driven (or for which data writing operations are performed) by the alternate driving operation at about 30 Hz may be less than the number of the pixel rows driven (or for which data writing operations are performed) by the normal driving operation at about 60 Hz, for example. Further, a data writing interval for each pixel PX at the alternate driving operation of about 30 Hz may be longer than a data writing interval for each pixel PX at the normal driving operation of about 60 Hz. Tus, hysteresis of a driving transistor of each pixel PX at the alternate driving operation of about 30 Hz may be different from that at the normal driving operation of about 60 Hz, and luminances of each pixel PX and the display panel 110 at the alternate driving operation of about 30 Hz may be different from those at the normal driving operation of about 60 Hz.

FIG. 6 illustrates a light waveform or a luminance 290 of the display device 100 performing the normal driving operation at the normal driving frequency (e.g., about 60 Hz) and a light waveform or a luminance 270 of the display device 100 performing the alternate driving operation at the low frequency (e.g., about 30 Hz). As illustrated in FIG. 6, the luminance 270 of the display device 100 at the alternate driving operation may be different from the luminance 290 of the display device 100 at the normal driving operation, and thus the flicker may occur when a driving mode is switched between the normal driving operation and the alternate driving operation.

However, in an embodiment of the display device 100, to compensate the luminance 270 at the alternate driving operation, the display device 100 may store a compensation value CV corresponding to a carry shift interval of the alternate driving operation, and may apply the compensation value CV to a flicker value determined using a flicker LUT 160. In an embodiment, the panel driver 120 may determine whether the input image data IDAT represents a still image. Further, in a case the input image data IDAT represents the still image, the panel driver 120 may determine a flicker value of the still image, may apply the compensation value CV corresponding to the carry shift interval of the alternate driving operation to the flicker value, may determine a driving frequency for the display panel 110 based on the flicker value to which the compensation value CV is applied, and may perform the alternate driving operation for the display panel 110 at the driving frequency. In an embodiment, to perform these operations, as illustrated in FIG. 7, the controller 150 of the panel driver 120 may include a still image detector 170 and a driving frequency decider 180.

The still image detector 170 may determine whether the input image data IDAT represents the still image. In an embodiment, the still image detector 170 may determine whether the input image data IDAT represents the still image by comparing the input image data IDAT in a previous frame period and the input image data IDAT in a current frame period. In an embodiment, the still image detector 170 may determine that the input image data IDAT does not represent the still image or that the input image data IDAT represents a moving image when the input image data IDAT in the previous frame period and the input image data IDAT in the current frame period are different from each other, and may determine that the input image data IDAT represents the still image when the input image data IDAT in the previous frame period and the input image data IDAT in the current frame period are substantially the same as each other, for example.

The driving frequency decider 180 may determine the driving frequency for the display panel 110 as the normal driving frequency when the input image data IDAT does not represent the still image, and may determine the driving frequency for the display panel 110 as the low frequency lower than the normal driving frequency based on the flicker value to which the compensation value CV is applied when the input image data IDAT represents the still image. The normal driving frequency may be a fixed frequency, for example, about 60 Hz, about 120 Hz, about 240 Hz, etc., and the low frequency may be any frequency lower than the normal driving frequency. In an embodiment, the driving frequency decider 180 may include a flicker LUT 160, an image analyzing block 185 and a carry compensation block 190.

The flicker LUT 160 may store a plurality of flicker values respectively corresponding to a plurality of gray levels (e.g., 256 gray levels from a 0-gray level to a 255-gray level). Here, the flicker value may represent a degree of a flicker perceived by a user. In an embodiment, as illustrated in FIG. 8, the flicker LUT 160 may store, but not limited to, a first flicker value FV1 corresponding to a first driving frequency DF1 with respect to a L1-gray level to a L2-gray level, and a second flicker value FV2 corresponding to a second driving frequency DF2 with respect to a L3-gray level to a L4-gray level, where L1 is an integer greater than or equal to 0, L2 is an integer greater than or equal to L1, L3 is an integer greater than L2, and L4 is an integer greater than or equal to L3 and less than or equal to 255, for example. In an embodiment, the plurality of flicker values stored in the flicker LUT 160 may be obtained by tests or experiments with respect to the display device 100 performing the normal driving operation, and a plurality of driving frequencies respectively corresponding to the plurality of flicker values may be previously determined by the tests or the experiments.

The image analyzing block 185 may determine a representative gray level of the input image data IDAT representing the still image, may determine the flicker value of the still image corresponding to the representative gray level by the flicker LUT 160, and may determine an original driving frequency before compensation for the display panel 110 according to the flicker value of the still image. In an embodiment, the representative gray level of the input image data IDAT may be, but not limited to, an average value, a maximum value or a minimum value of gray levels represented by a plurality of pixel data included in the input image data IDAT. In an embodiment, in a case where the representative gray level of the input image data IDAT is between the L1-gray level and the L2-gray level, the image analyzing block 185 may determine the flicker value of the still image as the first flicker value FV1 by the flicker LUT 160, and may determine the original driving frequency before compensation as the first driving frequency DF1, for example. Further, in a case where the representative gray level of the input image data IDAT is between the L3-gray level and the L4-gray level, the image analyzing block 185 may determine the flicker value of the still image as the second flicker value FV2 by the flicker LUT 160, and may determine the original driving frequency before compensation as the second driving frequency DF2. In an embodiment, determining the flicker value and determining the original driving frequency may be performed with respect to each pixel PX or with respect to an entirety of the display panel 110. In other embodiments, determining the flicker value and determining the original driving frequency may be performed on the basis of segment.

In an embodiment, as illustrated in FIG. 9, the display panel 110 may be divided into first through ninth segments S1 through S9, and the input image data IDAT for the display panel 110 may be divided into first through ninth segment data SDAT1 through SDAT9 for the first through ninth segments S1 through S9, for example. Although FIG. 9 illustrates an example where the display panel 110 is divided into the nine segments S1 through S9, the number of segments S1 through S9 in embodiments is not limited to the embodiment of FIG. 9. Further, as illustrated in FIG. 10, the image analyzing block 185 may determine first through ninth segment flicker values corresponding to representative gray levels of the first through ninth segment data SDAT1 through SDAT9 by the flicker LUT 160, and may determine first through ninth segment frequencies for the first through ninth segments S1 through S9 according to the first through ninth segment flicker values. Further, the image analyzing block 185 may determine the maximum segment frequency of the first through ninth segment frequencies as the original driving frequency before compensation for the display panel 110. In an embodiment of FIG. 10, since the first through ninth segment frequencies for the first through ninth segments S1 through S9 range from about 5 Hz to about 10 Hz, the image analyzing block 185 may determine the maximum segment frequency of about 10 Hz as the original driving frequency before compensation for the display panel 110.

The carry compensation block 190 may store the compensation value CV corresponding to the carry shift interval of the alternate driving operation, may apply the compensation value CV corresponding to the carry shift interval to the flicker value (or the original driving frequency before compensation) determined by the image analyzing block 185, and may determine the driving frequency for the display panel 110 based on the flicker value to which the compensation value CV is applied. In an embodiment, the carry compensation block 190 may calculate the flicker value to which the compensation value CV is applied by multiplying the flicker value by the compensation value CV. In an embodiment, as illustrated in FIG. 11, in a case where the representative gray level of the input image data IDAT is between the L1-gray level and the L2-gray level, the image analyzing block 185 may determine the flicker value of the still image as the first flicker value FV1 corresponding to the first driving frequency DF1 by the flicker LUT 160, the carry compensation block 190 may multiply the first flicker value FV1 by the compensation value CV of $\alpha$, and the driving frequency decider 180 may determine the driving frequency for the display panel 110 as a third driving frequency DF3 different from the first driving frequency DF1 based on the flicker value FV1$\times\alpha$ to which the compensation value CV is applied, for example. In an embodiment, the third driving frequency DF3 to which the compensation value CV corresponding to the carry shift interval is reflected may be lower than the first driving frequency DF1 to which the compensation value CV is not reflected. In other embodiments, the third driving frequency DF3 to which the compensation value CV corresponding to the carry shift interval is reflected may be higher than or equal to the first driving frequency DF1 to which the compensation value CV is not reflected. Further, in a case where the representative gray level of the input image data IDAT is between the L3-gray level and the L4-gray level, the image analyzing block 185 may determine the flicker value of the still image as the second flicker value FV2 corresponding to the second driving frequency DF2 by the flicker LUT 160, the carry compensation block 190 may multiply the second flicker value FV2 by the compensation value CV of $\alpha$, and the driving frequency decider 180 may determine the driving frequency for the display panel 110 as a fourth driving frequency DF4 different from the second driving frequency DF2 based on the flicker value $FV2\times\alpha$ to which the compensation value CV is applied.

As described above, in an embodiment of the display device 100, in a case where the input image data IDAT represents the still image, the panel driver 120 may determine the flicker value of the still image, may apply the compensation value CV corresponding to the carry shift interval of the alternate driving operation to the flicker value, and may determine the driving frequency for the display panel 110 based on the flicker value to which the compensation value CV is applied. Accordingly, since compensation is performed corresponding to the carry shift interval of the alternate driving operation, in an embodiment of the display device 100, the luminance difference between the normal driving operation and the alternate driving operation may be decreased, and the flicker may be prevented.

Figure 12:
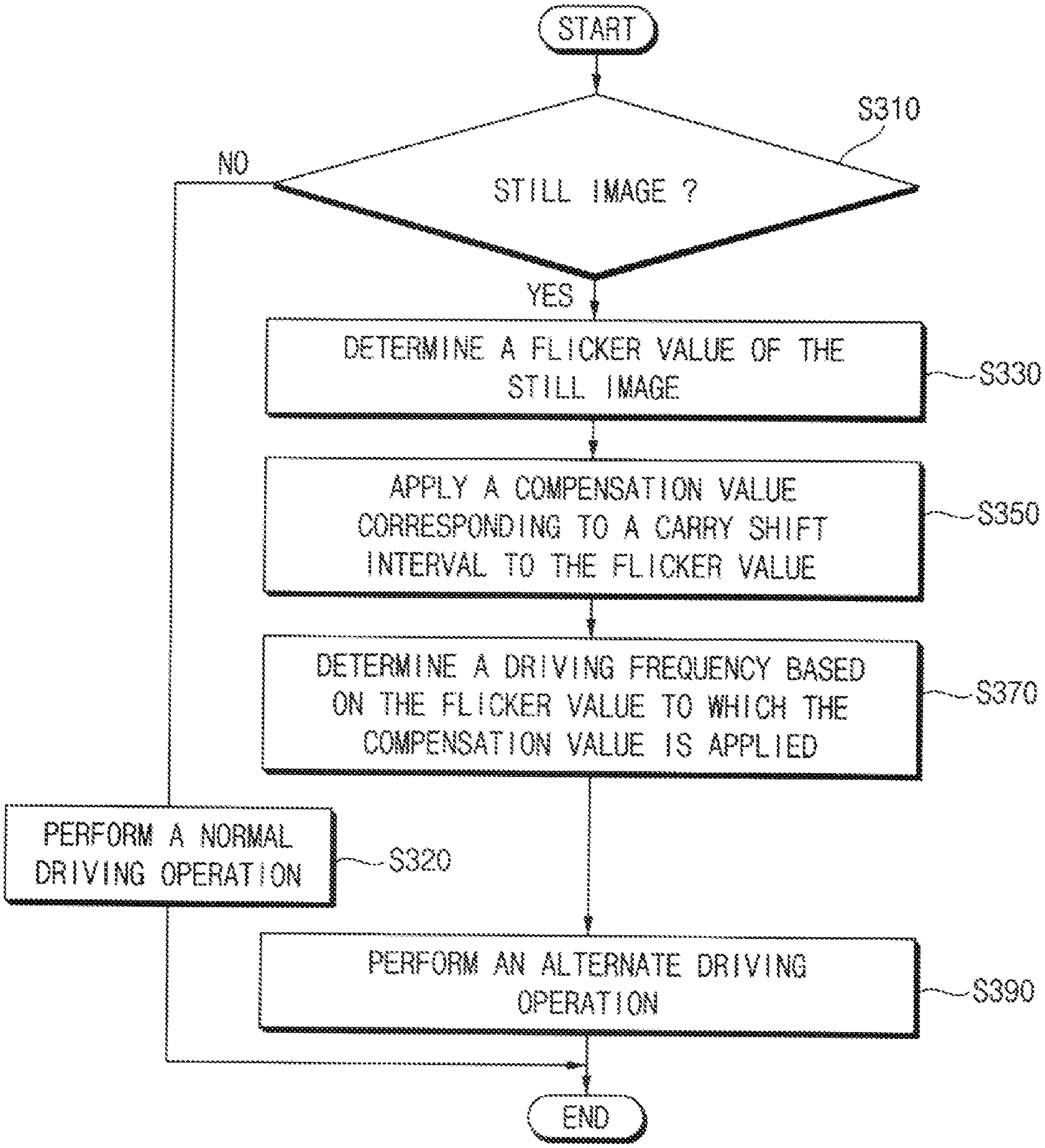
FIG. 12 is a flowchart illustrating an embodiment of a method of operating a display device.

FIG. 12 is a flowchart illustrating an embodiment of a method of operating a display device.

Referring to FIGS. 1 and 12, in an embodiment of a method of operating a display device 100, a panel driver 120 may determine whether input image data IDAT represents a still image (S310). In an embodiment, the panel driver 120 may compare the input image data IDAT in a previous frame period and the input image data IDAT in a current frame period, may determine that the input image data IDAT does not represent the still image when the input image data IDAT in the previous frame period and the input image data IDAT in the current frame period are different from each other, and may determine that the input image data IDAT represents the still image when the input image data IDAT in the previous frame period and the input image data IDAT in the current frame period are substantially the same as each other. In a case where the input image data IDAT does not represent the still image (S310: NO), the panel driver 120 may perform a normal driving operation for a display panel 110 (S320).

In a case where the input image data IDAT represents the still image (S310: YES), the panel driver 120 may determine a flicker value of the still image (S330). In an embodiment, the panel driver 120 may determine a representative gray level of the input image data IDAT representing the still image, and may determine the flicker value of the still image corresponding to the representative gray level by a flicker LUT 160 that stores a plurality of flicker values respectively corresponding to a plurality of gray levels.

The panel driver 120 may apply a compensation value CV corresponding to a carry shift interval of an alternate driving operation to the flicker value (S350). In an embodiment, the panel driver 120 may calculate the flicker value to which the compensation value CV is applied by multiplying the flicker value by the compensation value CV. Further, the panel driver 120 may determine a driving frequency for the display panel 110 based on the flicker value to which the compensation value CV is applied (S370), and may perform the alternate driving operation for the display panel 110 at the driving frequency (S390). In an embodiment, to perform the alternate driving operation, the panel driver 120 may divide a frame period into N periods, may divide a plurality of pixel rows of the display panel 110 into N pixel row groups each including the pixel rows having an interval of N pixel rows, and may sequentially drive the pixel rows included in a corresponding one of the N pixel row groups in each of the N periods, where N is an integer greater than 1.

As described above, since the driving frequency for the display panel 110 is determined by reflecting the compensation value CV to an original driving frequency before compensation determined using the flicker LUT 160, a luminance difference between the normal driving operation and the alternate driving operation may be decreased, and a flicker may be prevented.

Figure 13:
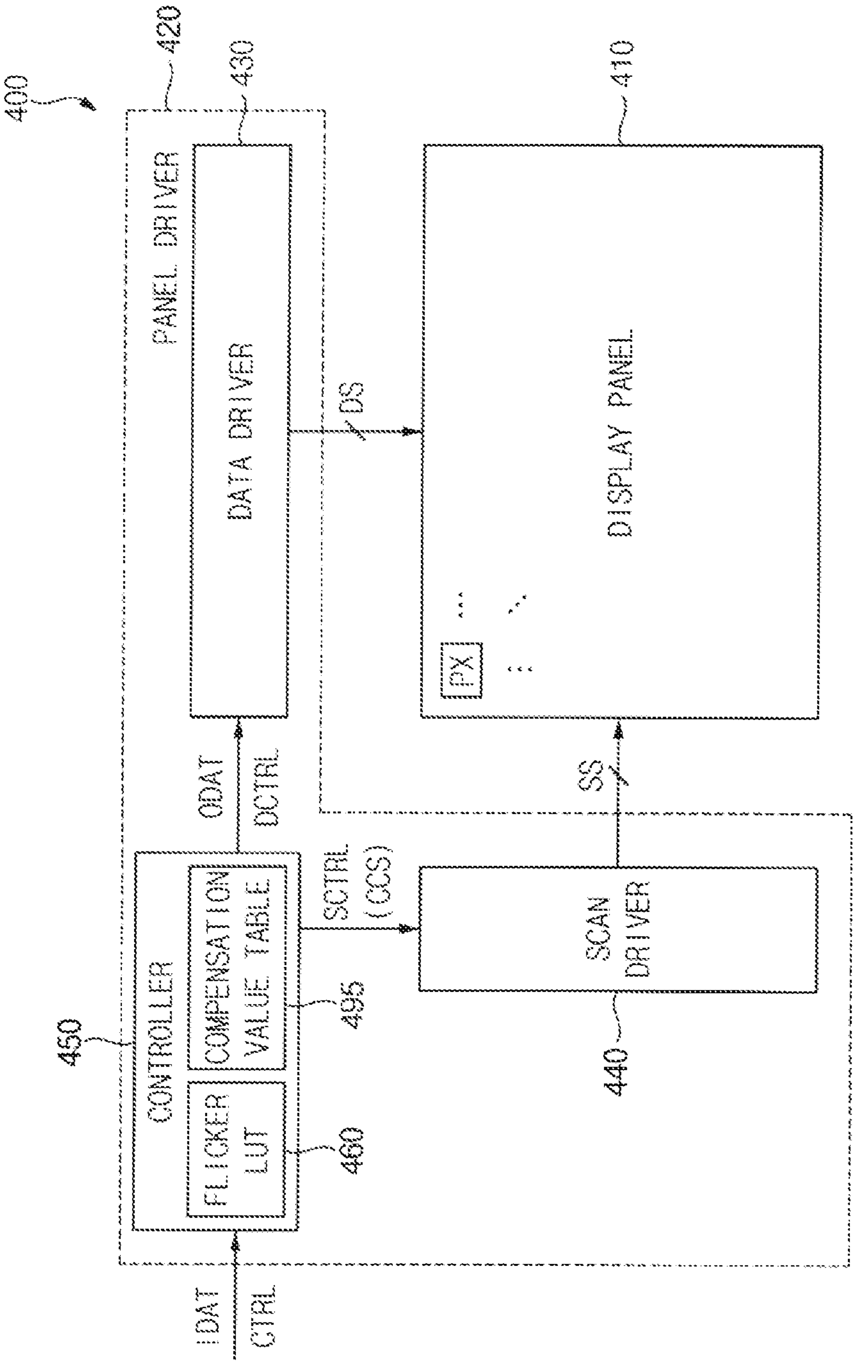
FIG. 13 is a block diagram illustrating an embodiment of a display device.
Figure 14:
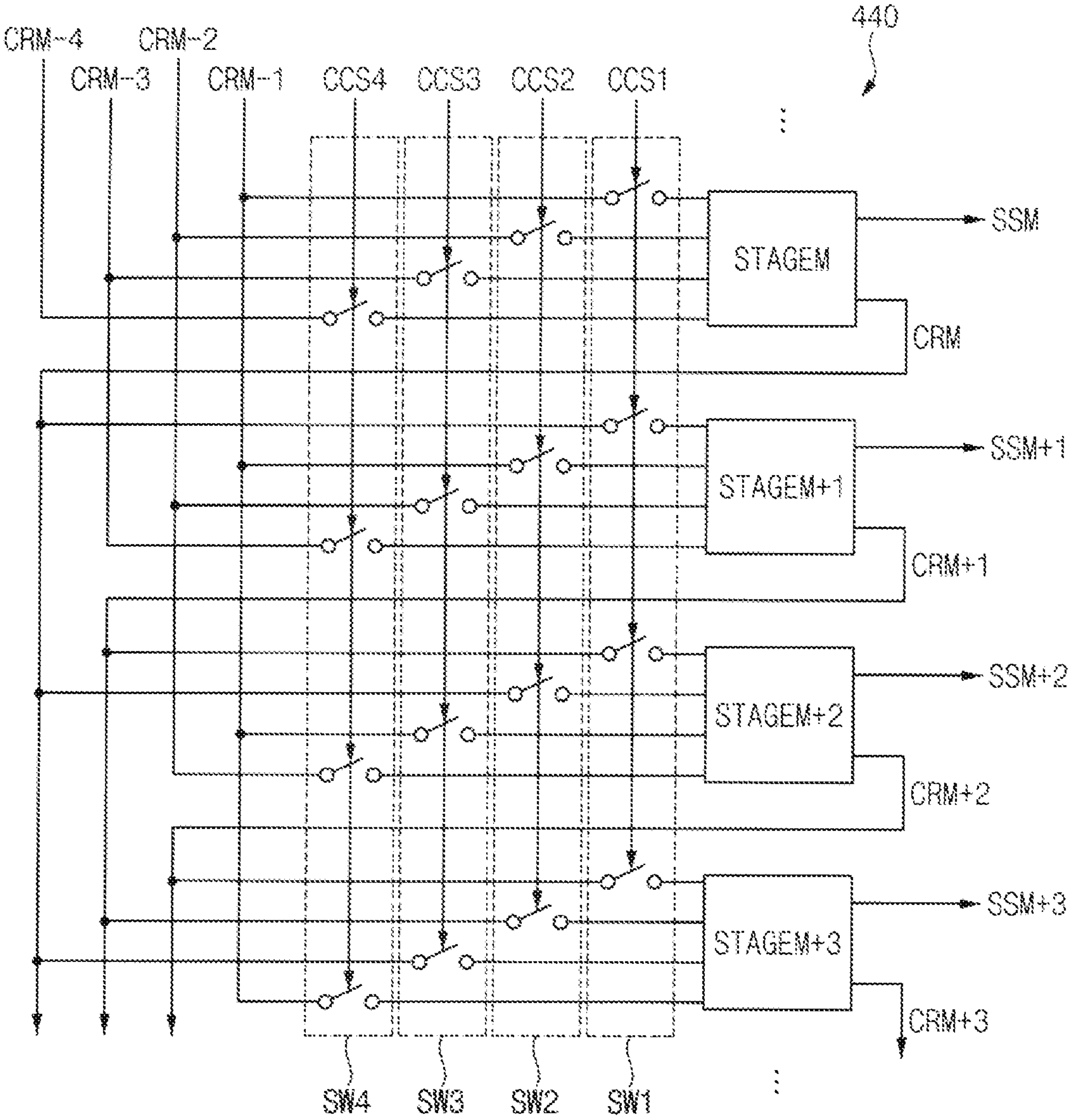
FIG. 14 is a block diagram illustrating an embodiment of a scan driver included in a display device.
Figure 15:
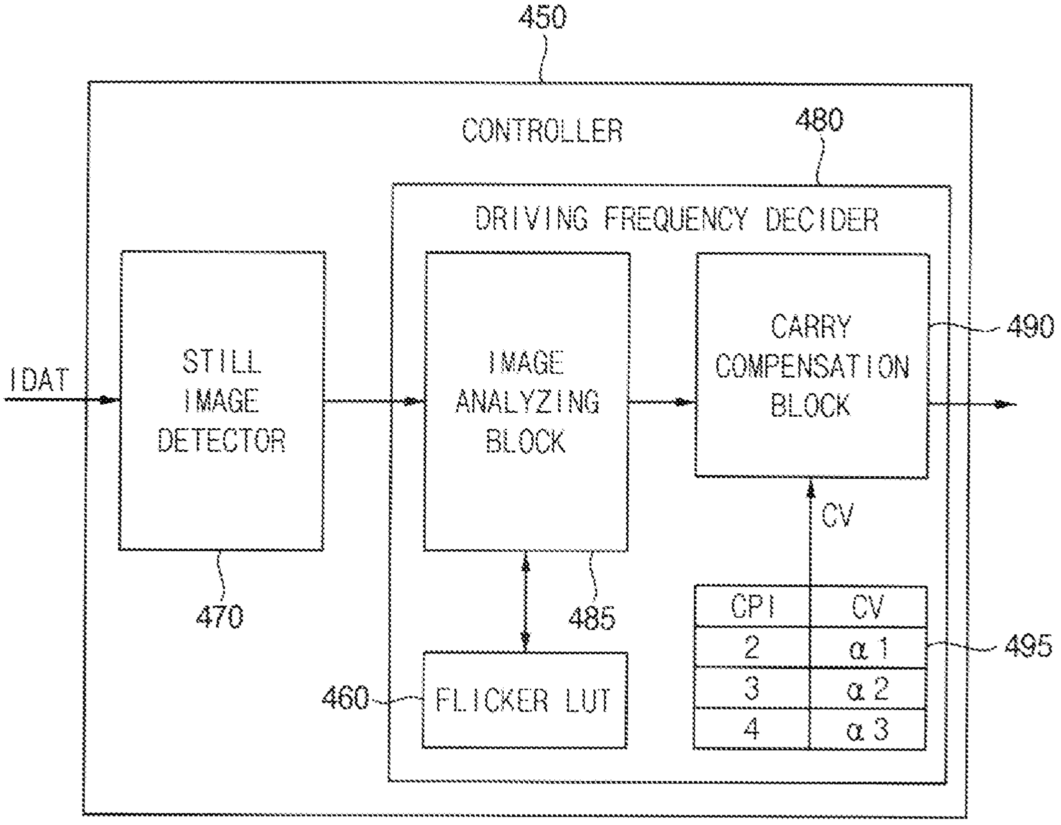
FIG. 15 is a block diagram illustrating an embodiment of a controller included in a display device.

FIG. 13 is a block diagram illustrating an embodiment of a display device, FIG. 14 is a block diagram illustrating an embodiment of a scan driver included in a display device, and FIG. 15 is a block diagram illustrating an embodiment of a controller included in a display device.

Referring to FIG. 13, a display device 400 in an embodiment may include a display panel 410 and a panel driver 420. In an embodiment, the panel driver 420 may include a data driver 430, a scan driver 440 and a controller 450. The display device 400 of FIG. 13 may have a similar configuration and a similar operation to a display device 100 of FIG. 1, except that the panel driver 420 may further include a carry compensation value table 495 that stores a plurality of compensation values respectively corresponding to a plurality of carry shift intervals.

The controller 450 may determine a carry shift interval as 1 when input image data IDAT represents a moving image, and may determine the carry shift interval based on an original driving frequency before compensation corresponding to a flicker value of a still image when the input image data IDAT represents the still image. In an embodiment, when the input image data IDAT represents the still image, the controller 450 may determine the carry shift interval by dividing a normal driving frequency by the original driving frequency determined using a flicker LUT 460. In an embodiment, in a case where the normal driving frequency is about 60 Hz, and the original driving frequency before compensation is about 30 Hz, the controller 450 may determine the carry shift interval as 2, for example. Further, the controller 450 may determine the carry shift interval as 3 in a case where the original driving frequency before compensation is about 20 Hz, and may determine the carry shift interval as 4 in a case where the original driving frequency before compensation is about 15 Hz. Further, the controller 450 may generate a carry control signal CCS corresponding to the carry shift interval, and may provide a scan control signal SCTRL including the carry control signal CCS to the scan driver 440. In an embodiment, as illustrated in FIG. 14, the carry control signal CCS may include, but not limited to, a first carry control signal CCS1 corresponding to the carry shift interval having a value of 1, a second carry control signal CCS2 corresponding to the carry shift interval having a value of 2, a third carry control signal CCS3 corresponding to the carry shift interval having a value of 3, and a fourth carry control signal CCS4 corresponding to the carry shift interval having a value of 4.

The scan driver 440 may include a plurality of stages (e.g., . . . , STAGEM, STAGEM+1, STAGEM+2, STA- GEM+3, . . . etc.) respectively providing scan signals (e.g., . . . , SSM, SSM+1, SSM+2, SSM+3, . . . etc.) to a plurality of pixel rows of the display panel 410 as illustrated in FIG. 14. Further, the scan driver 440 may shift or transfer a carry signal (e.g., . . . , CRM−4, CRM−3, CRM−2, CRM−1, CRM, CRM+1, CRM+2, CRM+3, . . . etc.) at the carry shift interval in the plurality of stages (e.g., . . . , STAGEM, STAGEM+1, STAGEM+2, STAGEM+3, . . . etc.) in response to the carry control signal CCS. To change the carry shift interval dynamically or in real time, as illustrated in FIG. 14, the scan driver 440 may further include a plurality of first switches SW1 that are turned on in response to the first carry control signal CCS1, a plurality of second switches SW2 that are turned on in response to the second carry control signal CCS2, a plurality of third switches SW3 that are turned on in response to the third carry control signal CCS3, and a plurality of fourth switches SW4 that are turned on in response to the fourth carry control signal CCS4.

In an embodiment, in a case where the scan driver 440 receives the first carry control signal CCS1, the plurality of first switches SW1 may sequentially connect the plurality of stages (e.g., . . . , STAGEM, STAGEM+1, STAGEM+2, STAGEM+3, . . . etc.) in response to the first carry control signal CCS1, for example. In this case, a (M)-th carry signal CRM generated by a (M)-th stage STAGEM based on a (M−1)-th carry signal CRM−1 may be shifted or transferred to a (M+1)-th stage STAGEM+1, a (M+1)-th carry signal CRM+1 generated by the (M+1)-th stage STAGEM+1 based on the (M)-th carry signal CRM may be shifted or transferred to a (M+2)-th stage STAGEM+2, a (M+2)-th carry signal CRM+2 generated by the (M+2)-th stage STAGEM+2 based on the (M+1)-th carry signal CRM+1 may be shifted or transferred to a (M+3)-th stage STAGEM+3, and a (M+3)-th carry signal CRM+3 generated by the (M+3)-th stage STAGEM+3 based on the (M+2)-th carry signal CRM+2 may be shifted or transferred to a (M+4)-th stage, where M is an integer greater than 4. Thus, the scan driver 440 may shift or transfer the carry signal CRM−4 through CRM+3 at the carry shift interval of 1 in response to the first carry control signal CCS1, and the panel driver 420 may perform a normal driving operation corresponding to the carry shift interval of 1.

Further, in a case where the scan driver 440 receives the second carry control signal CCS2, the plurality of second switches SW2 may connect the plurality of stages (e.g., . . . , STAGEM, STAGEM+1, STAGEM+2, STAGEM+3, . . . etc.) at an interval of two stages in response to the second carry control signal CCS2. Thus, even-numbered stages (e.g., . . . , STAGEM, STAGEM+2, . . . etc.) may be connected to each other, and odd-numbered stages (e.g., . . . , STAGEM+1, STAGEM+3, . . . etc.) may be connected to each other. In this case, a (M)-th carry signal CRM generated by a (M)-th stage STAGEM based on a (M−2)-th carry signal CRM−2 may be shifted or transferred to a (M+2)-th stage STAGEM+2, and a (M+2)-th carry signal CRM+2 generated by the (M+2)-th stage STAGEM+2 based on the (M)-th carry signal CRM may be shifted or transferred to a (M+4)-th stage. Further, a (M+1)-th carry signal CRM+1 generated by a (M+1)-th stage STAGEM+1 based on a (M−1)-th carry signal CRM−1 may be shifted or transferred to a (M+3)-th stage STAGEM+3, and a (M+3)-th carry signal CRM+3 generated by the (M+3)-th stage STAGEM+3 based on the (M+1)-th carry signal CRM+1 may be shifted or transferred to a (M+5)-th stage. Thus, the scan driver 440 may shift or transfer the carry signal CRM−4 through CRM+3 at the carry shift interval of 2 in response to the second carry control signal CCS2, and the panel driver 420 may perform an alternate driving operation corresponding to the carry shift interval of 2.

Further, in a case where the scan driver 440 receives the third carry control signal CCS3, the plurality of third switches SW3 may connect the plurality of stages (e.g., . . . , STAGEM, STAGEM+1, STAGEM+2, STAGEM+3, . . . etc.) at an interval of three stages in response to the third carry control signal CCS3. Thus, (3L−2)-th stages may be connected to each other, (3L−1)-th stages may be connected to each other, and (3L)-th stages may be connected to each other. In this case, a (M)-th carry signal CRM generated by a (M)-th stage STAGEM based on a (M−3)-th carry signal CRM−3 may be shifted or transferred to a (M+3)-th stage STAGEM+3, and a (M+3)-th carry signal CRM+3 generated by a (M+3)-th stage STAGEM+3 based on the (M)-th carry signal CRM may be shifted or transferred to a (M+6)-th stage. Further, a (M+1)-th carry signal CRM+1 generated by a (M+1)-th stage STAGEM+1 based on a (M−2)-th carry signal CRM−2 may be shifted or transferred to a (M+4)-th stage. Further, a (M+2)-th carry signal CRM+2 generated by a (M+2)-th stage STAGEM+2 based on a (M−1)-th carry signal CRM−1 may be shifted or transferred to a (M+5)-th stage. Thus, the scan driver 440 may shift or transfer the carry signal CRM−4 through CRM+3 at the carry shift interval of 3 in response to the third carry control signal CCS3, and the panel driver 420 may perform an alternate driving operation corresponding to the carry shift interval of 3.

Further, in a case where the scan driver 440 receives the fourth carry control signal CCS4, the plurality of fourth switches SW4 may connect the plurality of stages (e.g., . . . , STAGEM, STAGEM+1, STAGEM+2, STAGEM+3, . . . etc.) at an interval of four stages in response to the fourth carry control signal CCS4. Thus, (4K−3)-th stages may be connected to each other, (4K−2)-th stages may be connected to each other, (4K−1)-th stages may be connected to each other, and (4K)-th stages may be connected to each other, where K is an integer greater than 4. In this case, a (M)-th carry signal CRM generated by a (M)-th stage STAGEM based on a (M−4)-th carry signal CRM−4 may be shifted or transferred to a (M+4)-th stage. Further, a (M+1)-th carry signal CRM+1 generated by a (M+1)-th stage STAGEM+1 based on a (M−3)-th carry signal CRM−3 may be shifted or transferred to a (M+5)-th stage. Further, a (M+2)-th carry signal CRM+2 generated by a (M+2)-th stage STAGEM+2 based on a (M−2)-th carry signal CRM−2 may be shifted or transferred to a (M+6)-th stage. Further, a (M+3)-th carry signal CRM+3 generated by a (M+3)-th stage STAGEM+3 based on a (M−1)-th carry signal CRM−1 may be shifted or transferred to a (M+7)-th stage. Thus, the scan driver 440 may shift or transfer the carry signal CRM−4 through CRM+3 at the carry shift interval of 4 in response to the fourth carry control signal CCS4, and the panel driver 420 may perform an alternate driving operation corresponding to the carry shift interval of 4.

The controller 450 may determine whether the input image data IDAT represents the still image. When the input image data IDAT represents the still image, the controller 450 may determine a flicker value of the still image, may read a compensation value CV corresponding to the carry shift interval of the alternate driving operation from the carry compensation value table 495, may apply the compensation value CV corresponding to the carry shift interval to the flicker value, may determine a driving frequency for the display panel 410 based on the flicker value to which the compensation value CV is applied, and may perform the alternate driving operation for the display panel 410 based on the driving frequency. In an embodiment, to perform these operations, as illustrated in FIG. 15, the controller 450 may include a still image detector 470 that determines whether the input image data IDAT represents the still image, and a driving frequency decider 480.

The driving frequency decider 480 may include a flicker LUT 460 that stores a plurality of flicker values respectively corresponding to a plurality of gray levels, an image analyzing block 485 that determines a representative gray level of the input image data IDAT representing the still image, and determines the flicker value of the still image corresponding to the representative gray level by the flicker LUT 460, a carry compensation value table 495 and a carry compensation block 490.

The carry compensation value table 495 may store a plurality of compensation values CV respectively corresponding to a plurality of carry shift intervals CPI. In an embodiment, the panel driver 420 may perform the normal driving operation at a carry shift interval CPI of 1 or the alternate driving operation at a carry shift interval CPI of 2, a carry shift interval CPI of 3 or a carry shift interval CPI of 4. In this case, the carry compensation value table 495 may store, but not limited to, a compensation value CV of $\alpha 1$ corresponding to the carry shift interval CPI of 2, a compensation value CV of $\alpha 2$ corresponding to the carry shift interval CPI of 3, and a compensation value CV of $\alpha 3$ corresponding to the carry shift interval CPI of 4, for example.

The carry compensation block 490 may read the compensation value CV corresponding to a current carry shift interval from the carry compensation value table 495. In an embodiment, the carry compensation block 490 may read the compensation value CV of $\alpha 1$ when the alternate driving operation is performed at the carry shift interval CPI of 2, may read the compensation value CV of $\alpha 2$ when the alternate driving operation is performed at the carry shift interval CPI of 3, and may read the compensation value CV of $\alpha 3$ when the alternate driving operation is performed at the carry shift interval CPI of 4, for example. The carry compensation block 490 may apply the compensation value CV corresponding to the current carry shift interval to the flicker value, and may determine the driving frequency for the display panel 410 based on the flicker value to which the compensation value CV is applied. In an embodiment, the carry compensation block 490 may determine the driving frequency by multiplying the flicker value by the compensation value CV of $\alpha 1$ when the alternate driving operation is performed at the carry shift interval CPI of 2, may determine the driving frequency by multiplying the flicker value by the compensation value CV of $\alpha 2$ when the alternate driving operation is performed at the carry shift interval CPI of 3, and may determine the driving frequency by multiplying the flicker value by the compensation value CV of $\alpha 3$ when the alternate driving operation is performed at the carry shift interval CPI of 4, for example. When the display panel 410 is driven at the driving frequency determined based on the flicker value to which the compensation value CV corresponding to the current carry shift interval is applied, a flicker may be prevented.

As described above, in an embodiment of the display device 400, in a case where the input image data IDAT represents the still image, the panel driver 420 may determine the flicker value of the still image, may read the compensation value CV corresponding to the current carry shift interval from the carry compensation value table 495, may apply the compensation value CV corresponding to the current carry shift interval to the flicker value, may determine the driving frequency for the display panel 410 based on the flicker value to which the compensation value CV is applied, and may perform the alternate driving operation for the display panel 410 at the driving frequency. Accordingly, since compensation is performed corresponding to the current carry shift interval, in an embodiment of the display device 400, a luminance difference between the normal driving operation and the alternate driving operation may be decreased, and the flicker may be prevented.

Figure 16:
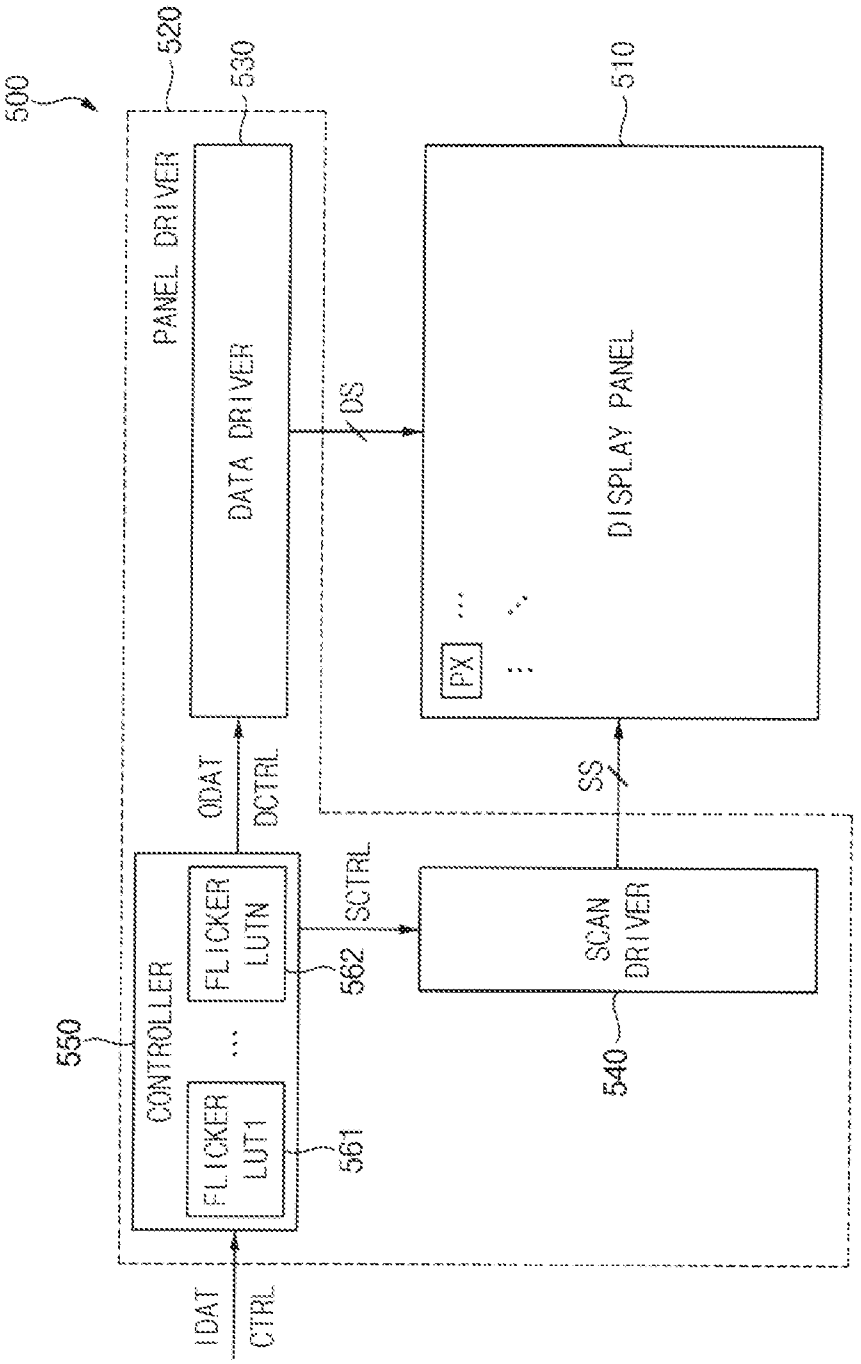
FIG. 16 is a block diagram illustrating an embodiment of a display device.
Figure 17:
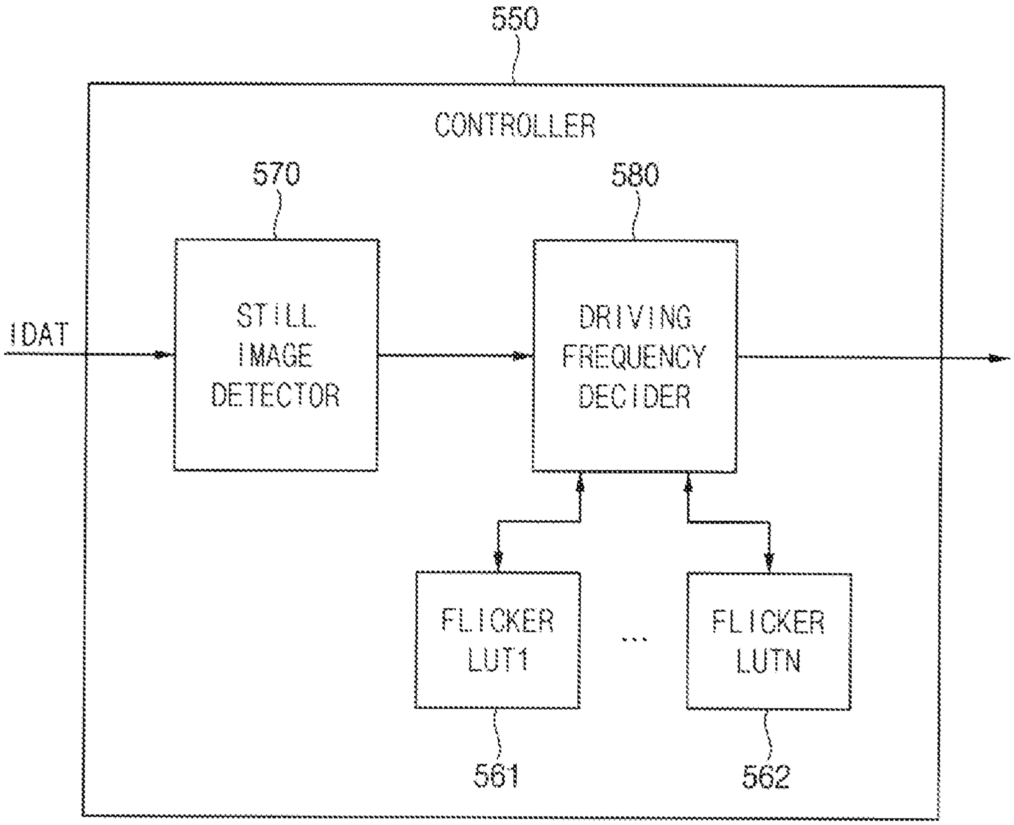
FIG. 17 is a block diagram illustrating an embodiment of a controller included in a display device.

FIG. 16 is a block diagram illustrating an embodiment of a display device, and FIG. 17 is a block diagram illustrating an embodiment of a controller included in a display device.

Referring to FIG. 16, a display device 500 in an embodiment may include a display panel 510 and a panel driver 520. In an embodiment, the panel driver 520 may include a data driver 530, a scan driver 540 and a controller 550. The display device 500 of FIG. 16 may have a similar configuration and a similar operation to a display device 100 of FIG. 1 or a display device 400 of FIG. 13, except that the panel driver 520 may further include a plurality of flicker LUTs 561, . . . , 562 respectively corresponding to a plurality of carry shift intervals.

The controller 550 may include the plurality of flicker LUTs 561, . . . , 562 respectively corresponding to the plurality of carry shift intervals. In an embodiment, each of the plurality of flicker LUTs 561, . . . , 562 may store a plurality of flicker values respectively corresponding to a plurality of gray levels with respect to a corresponding one of the plurality of carry shift intervals. In an embodiment, a first flicker LUT 561 may store a plurality of flicker values obtained by tests or experiments with respect to the display device 500 performing a normal driving operation at a carry shift interval of 1, and a (N)-th flicker LUT 562 may store a plurality of flicker values obtained by tests or experiments with respect to the display device 500 performing an alternate driving operation at a carry shift interval of N, where N is an integer greater than 1, for example.

The controller 550 may determine whether input image data IDAT represents a still image. When the input image data IDAT represents the still image, the controller 550 may select a flicker LUT (e.g., 562) corresponding to a current carry shift interval from among the plurality of flicker LUTs 561, . . . , 562, may determine a flicker value of the still image by the selected flicker LUT (e.g., 562), may determine a driving frequency for the display panel 510 based on the flicker value, and may perform the alternate driving operation for the display panel 510 at the driving frequency. Since the plurality of flicker values stored in the selected flicker LUT (e.g., 562) are obtained by the tests or experiments with respect to the display device 500 performing the alternate driving operation at the current carry shift interval, the flicker value determined using the selected flicker LUT (e.g., 562) may compensate a luminance difference by the alternate driving operation. Thus, the luminance difference at the alternate driving operation may be decreased, and a flicker may be prevented.

In an embodiment, the controller 550 may further include a still image detector 570 and a driving frequency decider 580. The still image detector 570 may determine whether the input image data IDAT represents the still image. When the input image data IDAT does not represent the still image, the driving frequency decider 580 may determine the driving frequency for the display panel 510 as a normal driving frequency. When the input image data IDAT represents the still image, the driving frequency decider 580 may determine a representative gray level of the input image data IDAT representing the still image, may select the flicker LUT corresponding to the current carry shift interval from among the plurality of flicker LUTs 561, . . . , 562, may determine the flicker value of the still image corresponding to the representative gray level by the selected flicker LUT, and may determine the driving frequency for the display panel 510 based on the flicker value.

As described above, in an embodiment of the display device 500, in a case where the input image data IDAT represents the still image, the panel driver 520 may determine the driving frequency for the display panel 510 by the plurality of flicker LUTs 561, . . . , 562 respectively corresponding to the plurality of carry shift intervals, and may perform the alternate driving operation for the display panel 510 at the driving frequency. Accordingly, since the flicker LUT corresponding to the current carry shift interval of the alternate driving operation is used, a luminance difference between the normal driving operation and the alternate driving operation may be decreased, and the flicker may be prevented.

Figure 18:
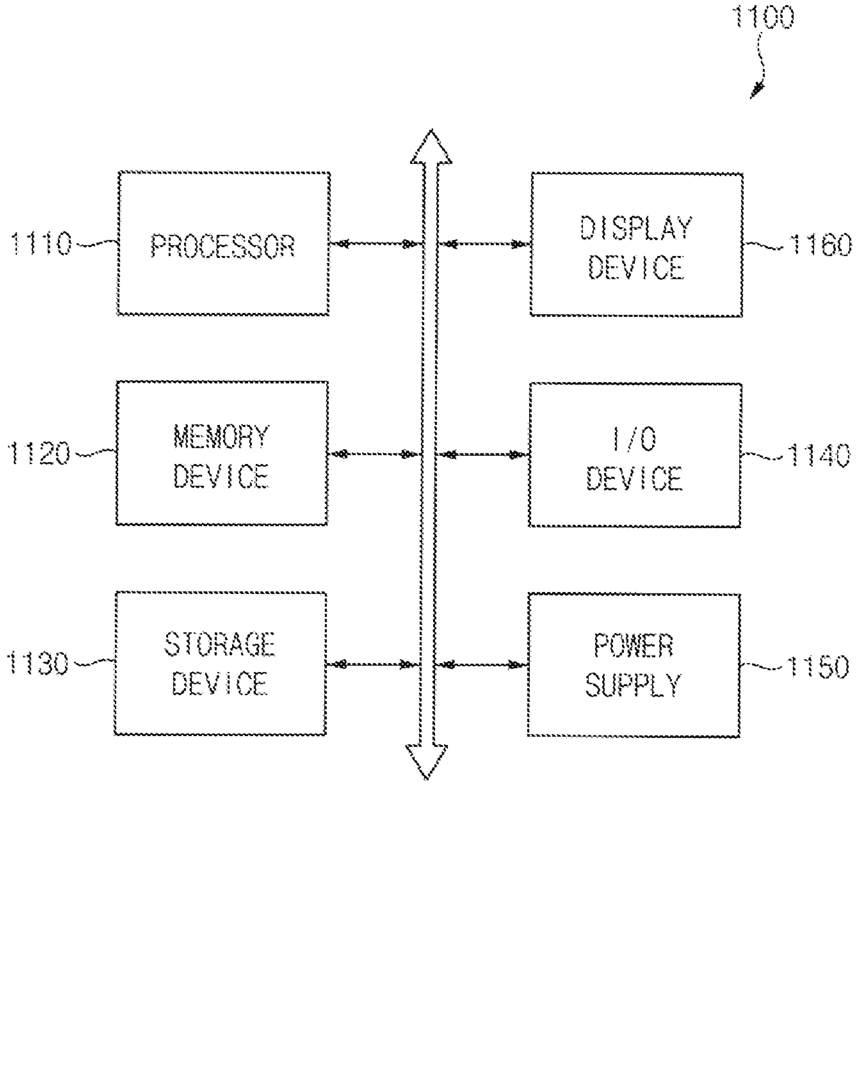
FIG. 18 is a block diagram illustrating an embodiment of an electronic device including a display device.

FIG. 18 is a block diagram illustrating an embodiment of an electronic device including a display device.

Referring to FIG. 18, an electronic device 1100 may include a processor 1110, a memory device 1120, a storage device 1130, an input/output ("I/O") device 1140, a power supply 1150, and a display device 1160. In an embodiment, the electronic device 1100 may further include a plurality of ports for communicating a video card, a sound card, a memory card, a universal serial bus ("USB") device, other electric devices, etc.

The processor 1110 may perform various computing functions or tasks. In an embodiment, the processor 1110 may be an application processor ("AP"), a microprocessor, a central processing unit ("CPU"), etc. In an embodiment, the processor 1110 may be coupled to other components via an address bus, a control bus, a data bus, etc. Further, in an embodiment, the processor 1110 may be further coupled to an extended bus such as a peripheral component interconnection ("PCI") bus.

The memory device 1120 may store data for operations of the electronic device 1100. In an embodiment, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile dynamic random access memory ("mobile DRAM") device, etc., for example.

In an embodiment, the storage device 1130 may be a solid state drive ("SSD") device, a hard disk drive ("HDD") device, a compact disc read-only memory ("CD-ROM") device, etc. In an embodiment, the I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, in a case where input image data represents a still image, a flicker value of the still image may be determined, a compensation value corresponding to a carry shift interval may be applied to the flicker value, a driving frequency for a display panel may be determined based on the flicker value to which the compensation value is applied, and an alternate driving operation for the display panel may be performed at the driving frequency. Accordingly, since compensation is performed corresponding to the carry shift interval of the alternate driving operation, a luminance difference between a normal driving operation and the alternate driving operation may be decreased, and a flicker may be prevented.

Embodiments of the inventions may be applied to any display device 1160, and any electronic device 1100 including the display device 1160. The embodiments may be applied to a mobile phone, a smart phone, a wearable electronic device, a tablet computer, a television ("TV"), a digital TV, a three-dimensional ("3D") TV, a personal computer ("PC"), a home appliance, a laptop computer, a personal digital assistant ("PDA"), a portable multimedia player ("PMP"), a digital camera, a music player, a portable game console, a navigation device, etc., for example.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the invention. Accordingly, all such modifications are intended to be included within the scope of the invention as defined in the claims. Therefore, it is to be understood that the foregoing is illustrative of various embodiments and is not to be construed as limited to the embodiments disclosed, and that modifications to the disclosed embodiments, as well as other embodiments, are intended to be included within the scope of the appended claims.

What is claimed is:

1. A display device comprising:

a display panel including a plurality of pixel rows;

a panel driver which drives the display panel; and a scan driver including a plurality of stages respectively providing scan signals to the plurality of pixel rows, wherein the panel driver determines whether input image data represents a still image, wherein, when the input image data represents the still image, the panel driver determines a flicker value of the still image, applies a compensation value corresponding to a carry shift interval to the flicker value, determines a driving frequency for the display panel based on the flicker value to which the compensation value is applied, and performs an alternate driving operation for the display panel at the driving frequency, wherein the scan driver shifts a carry signal at the carry shift interval in the plurality of stages, wherein the carry shift interval is an interval between a first stage which applies the carry signal and a second stage which directly receives the carry signal among the plurality of stages, and wherein the carry shift interval is controlled by a first switch and a second switch respectively connected to an input terminal of the first stage and an input terminal of the second stage.

2. The display device of claim 1, wherein, to perform the alternate driving operation, the panel driver divides a frame period into N periods, divides the plurality of pixel rows into N pixel row groups each including pixel rows, among the plurality of pixel rows, having an interval of N pixel rows, and sequentially drives the pixel rows included in a corresponding one of the N pixel row groups in each of the N periods, where N is an integer greater than 1.

3. The display device of claim 1, wherein the panel driver includes:

a still image detector which determines whether the input image data represents the still image; and a driving frequency decider which determines the driving frequency for the display panel as a normal driving frequency when the input image data does not represent the still image, and determines the driving frequency for the display panel as a low frequency lower than the normal driving frequency based on the flicker value to which the compensation value is applied when the input image data represents the still image.

4. The display device of claim 3, wherein the panel driver performs a normal driving operation for the display panel at the normal driving frequency when the input image data does not represent the still image, and performs the alternate driving operation for the display panel at the low frequency when the input image data represents the still image.

5. The display device of claim 3, wherein the still image detector determines whether the input image data represents the still image by comparing the input image data in a previous frame period and the input image data in a current frame period.

6. The display device of claim 3, wherein the driving frequency decider includes:

a flicker lookup table which stores a plurality of flicker values respectively corresponding to a plurality of gray levels;

an image analyzing block which determines a representative gray level of the input image data representing the still image, and determines the flicker value of the still image corresponding to the representative gray level by the flicker lookup table; and a carry compensation block which stores the compensation value corresponding to the carry shift interval, applies the compensation value corresponding to the carry shift interval to the flicker value, and determines the driving frequency for the display panel based on the flicker value to which the compensation value is applied.

7. The display device of claim 6, wherein the representative gray level of the input image data is an average value, a maximum value or a minimum value of gray levels represented by a plurality of pixel data included in the input image data.

8. The display device of claim 6, wherein the carry compensation block calculates the flicker value to which the compensation value is applied by multiplying the flicker value by the compensation value.

9. The display device of claim 3, wherein the driving frequency decider includes:

a flicker lookup table which stores a plurality of flicker values respectively corresponding to a plurality of gray levels;

an image analyzing block which determines a representative gray level of the input image data representing the still image, and determines the flicker value of the still image corresponding to the representative gray level by the flicker lookup table;

a carry compensation value table which stores a plurality of compensation values respectively corresponding to a plurality of carry shift intervals; and a carry compensation block which reads the compensation value corresponding to the carry shift interval of the alternate driving operation from the carry compensation value table, applies the compensation value corresponding to the carry shift interval to the flicker value, and determines the driving frequency for the display panel based on the flicker value to which the compensation value is applied.

10. The display device of claim 1, wherein the panel driver includes:

a controller which determines the carry shift interval based on an original driving frequency before compensation corresponding to the flicker value of the still image, and generates a carry control signal corresponding to the carry shift interval.

11. The display device of claim 10, wherein the controller determines the carry shift interval by dividing a normal driving frequency by the original driving frequency before the compensation.

12. The display device of claim 10, wherein the carry control signal includes a first carry control signal corresponding to the carry shift interval having a value of 1, a second carry control signal corresponding to the carry shift interval having a value of 2, a third carry control signal corresponding to the carry shift interval having a value of 3, and a fourth carry control signal corresponding to the carry shift interval having a value of 4, and wherein the scan driver further includes:

a plurality of first switches which sequentially connects the plurality of stages in response to the first carry control signal;

a plurality of second switches which connects the plurality of stages at an interval of two stages in response to the second carry control signal;

a plurality of third switches which connects the plurality of stages at an interval of three stages in response to the third carry control signal; and a plurality of fourth switches which connects the plurality of stages at an interval of four stages in response to the fourth carry control signal.

13. A display device comprising:

a display panel including a plurality of pixel rows; and a panel driver which drives the display panel and includes a plurality of flicker lookup tables respectively corresponding to a plurality of carry shift intervals, wherein the panel driver determines whether input image data represents a still image, and wherein, when the input image data represents the still image, the panel driver selects a flicker lookup table corresponding to a current carry shift interval from among the plurality of flicker lookup tables, determines a flicker value of the still image by the selected flicker lookup table, determines a driving frequency for the display panel based on the flicker value, and performs an alternate driving operation for the display panel at the driving frequency.

14. The display device of claim 13, wherein each of the plurality of flicker lookup tables stores a plurality of flicker values respectively corresponding to a plurality of gray levels with respect to a corresponding one of the plurality of carry shift intervals.

15. The display device of claim 13, wherein the panel driver further includes:

a still image detector which determines whether the input image data represents the still image; and a driving frequency decider which determines the driving frequency for the display panel as a normal driving frequency when the input image data does not represent the still image, wherein, when the input image data represents the still image, the driving frequency decider determines a representative gray level of the input image data representing the still image, selects the flicker lookup table corresponding to the current carry shift interval from among the plurality of flicker lookup tables, determines the flicker value of the still image corresponding to the representative gray level by the selected flicker lookup table, and determines the driving frequency for the display panel based on the flicker value.

16. A method of operating a display device, the method comprising:

determining whether input image data represents a still image;

determining a flicker value of the still image when the input image data represents the still image;

applying a compensation value corresponding to a carry shift interval to the flicker value;

determining a driving frequency for a display panel based on the flicker value to which the compensation value is applied; and performing, by a scan driver including a plurality of stages, an alternate driving operation for the display panel at the driving frequency wherein the carry shift interval is an interval between a first stage which applies a carry signal and a second stage which directly receives the carry signal among the plurality of stages, and the carry shift interval is controlled by a first switch and a second switch respectively connected to an input terminal of the first stage and an input terminal of the second stage.

17. The method of claim 16, wherein the performing the alternate driving operation includes:

dividing a frame period into N periods, where N is an integer greater than 1;

dividing a plurality of pixel rows of the display panel into N pixel row groups each including pixel rows, among the plurality of pixel rows, having an interval of N pixel rows; and sequentially driving the pixel rows included in a corresponding one of the N pixel row groups in each of the N periods.

18. The method of claim 16, wherein the determining whether the image data represents the still image includes:

comparing the input image data in a previous frame period and the input image data in a current frame period;

determining that the input image data does not represent the still image when the input image data in the previous frame period and the input image data in the current frame period are different from each other; and determining that the input image data represents the still image when the input image data in the previous frame period and the input image data in the current frame period are substantially identical to each other.

19. The method of claim 16, wherein the determining the flicker value of the still image includes:

determining a representative gray level of the input image data representing the still image; and determining the flicker value of the still image corresponding to the representative gray level by a flicker lookup table which stores a plurality of flicker values respectively corresponding to a plurality of gray levels.

20. The method of claim 16, wherein the applying the compensation value to the flicker value includes:

calculating the flicker value to which the compensation value is applied by multiplying the flicker value by the compensation value.

* * * * *